(12) United States Patent
Kim et al.

(10) Patent No.: US 10,542,250 B2
(45) Date of Patent: Jan. 21, 2020

(54) LIGHT FIELD DISPLAY APPARATUS

(71) Applicant: SAMSUNG DISPLAY CO., LTD., Yongin-si, Gyeonggi-Do (KR)

(72) Inventors: Beomshik Kim, Yongin-si (KR); Jaejoong Kwon, Suwon-si (KR); Joo Woan Cho, Seongnam-si (KR); Sujung Huh, Yongin-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 102 days.

(21) Appl. No.: 15/688,301

(22) Filed: Aug. 28, 2017

(65) Prior Publication Data

US 2018/0124386 A1  May 3, 2018

(30) Foreign Application Priority Data

Oct. 28, 2016  (KR) ........................ 10-2016-0142390

(51) Int. Cl.

| | |
|---|---|
| *H04N 13/305* | (2018.01) |
| *H04N 13/363* | (2018.01) |
| *H04N 13/327* | (2018.01) |
| *H04N 13/324* | (2018.01) |
| *H04N 13/317* | (2018.01) |
| *H04N 13/286* | (2018.01) |

(Continued)

(52) U.S. Cl.
CPC ....... *H04N 13/363* (2018.05); *G02B 27/2214* (2013.01); *H04N 13/286* (2018.05); *H04N 13/305* (2018.05); *H04N 13/317* (2018.05); *H04N 13/324* (2018.05); *H04N 13/327* (2018.05); *H04N 13/351* (2018.05)

(58) Field of Classification Search
None
See application file for complete search history.

(56) References Cited

U.S. PATENT DOCUMENTS

| | | | |
|---|---|---|---|
| 6,064,424 A | | 5/2000 | Van Berkel et al. |
| 9,813,695 B2 | * | 11/2017 | Kroon .................. H04N 13/302 |

(Continued)

FOREIGN PATENT DOCUMENTS

KR     1295329     8/2013

OTHER PUBLICATIONS

2016 Zhuang, "Moire-reductionmethodforslanted-lenticular-based quasi-three-dimensionaldisplays" OpticsCommunications (Year: 2019).*

(Continued)

*Primary Examiner* — Jayanti K Patel
*Assistant Examiner* — Shadan E Haghani
(74) *Attorney, Agent, or Firm* — F. Chau & Associates, LLC

(57) ABSTRACT

A light field display apparatus includes a display panel and a micro lens array. The display panel includes a plurality of sub-pixels arranged in a matrix. The micro lens array is disposed on the display panel. The micro lens array includes a plurality of micro lenses. Each of the plurality of sub pixels emits light of a single color, of a set of primary colors. The arrangement of the micro lens array, relative to the display panel, causes the light of certain sub pixels, of the plurality of sub pixels to be emphasized. The micro lens array is arranged, relative to the display panel, so that sub pixels of each primary color are emphasized to a same extent.

25 Claims, 19 Drawing Sheets

(51) Int. Cl.
  *H04N 13/351* (2018.01)
  *G02B 27/22* (2018.01)

(56) References Cited

U.S. PATENT DOCUMENTS

| | | | |
|---|---|---|---|
| 10,212,413 B2* | 2/2019 | Kroon | G02B 27/225 |
| 2012/0212486 A1* | 8/2012 | Van Der Horst | H04N 5/268 |
| | | | 345/419 |
| 2013/0050594 A1* | 2/2013 | Hirayama | G02B 27/2214 |
| | | | 349/15 |
| 2017/0307898 A1* | 10/2017 | Vdovin | G02B 27/2214 |

OTHER PUBLICATIONS

How LEDs produce white light (Year: 0000).*

* cited by examiner

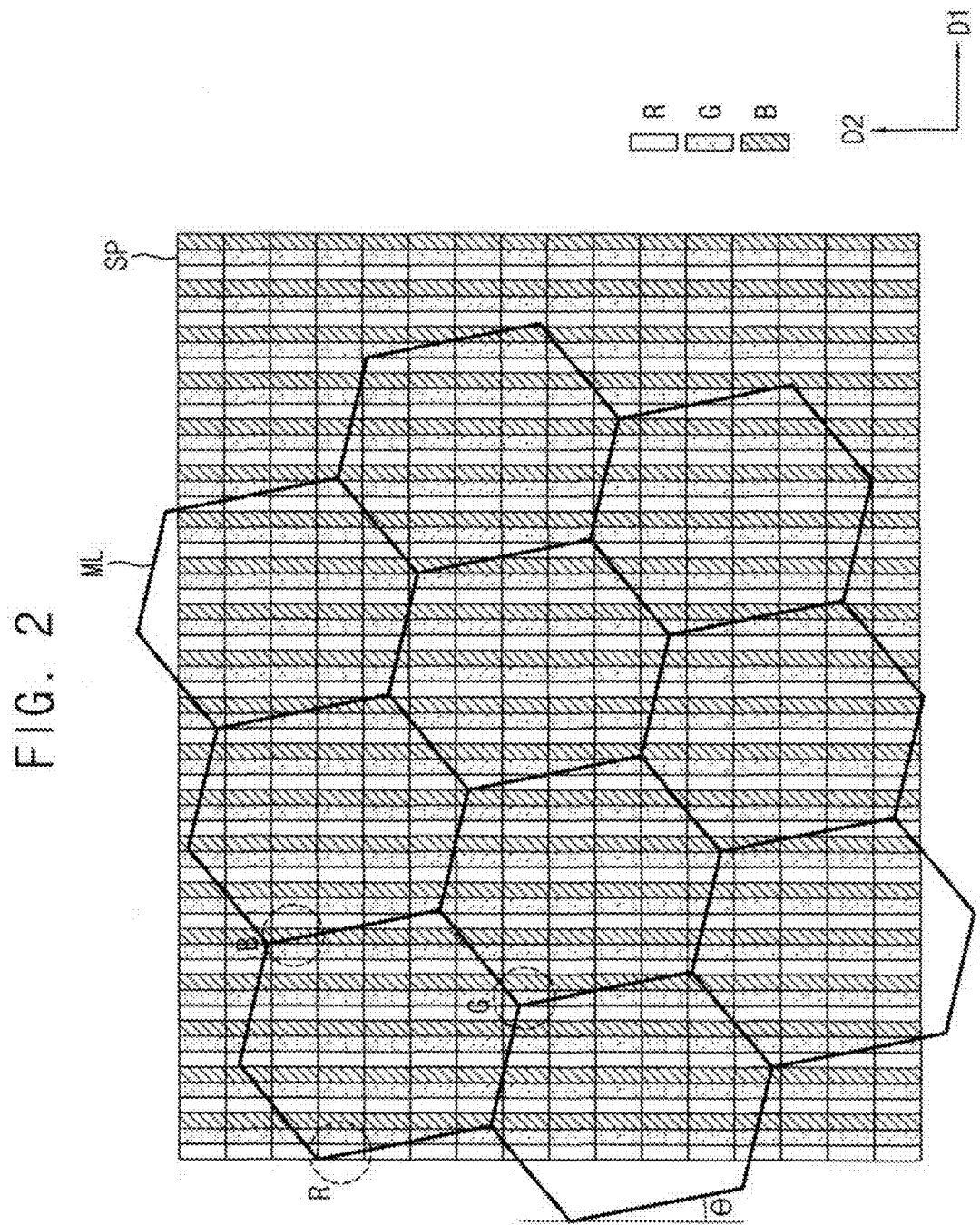

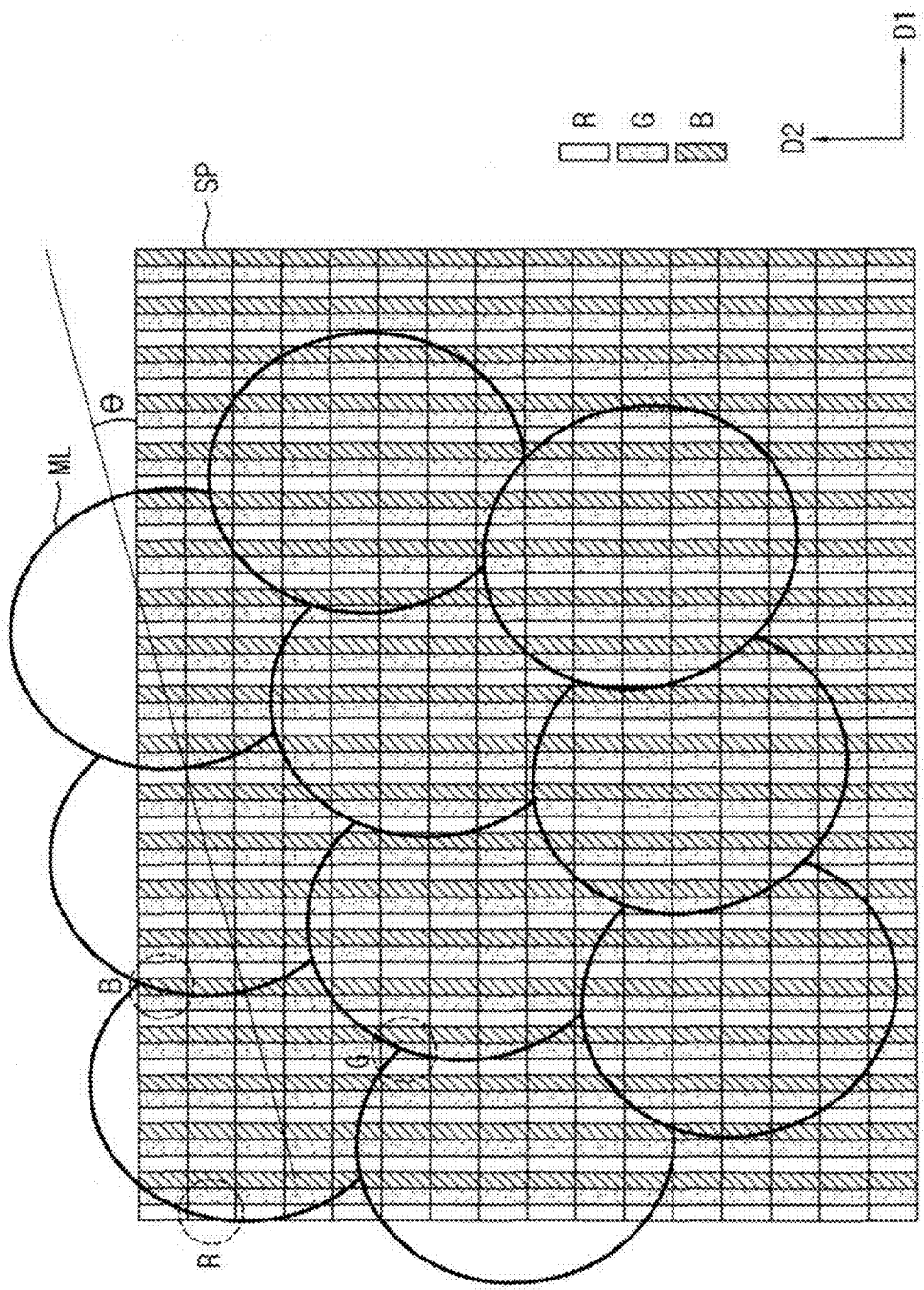

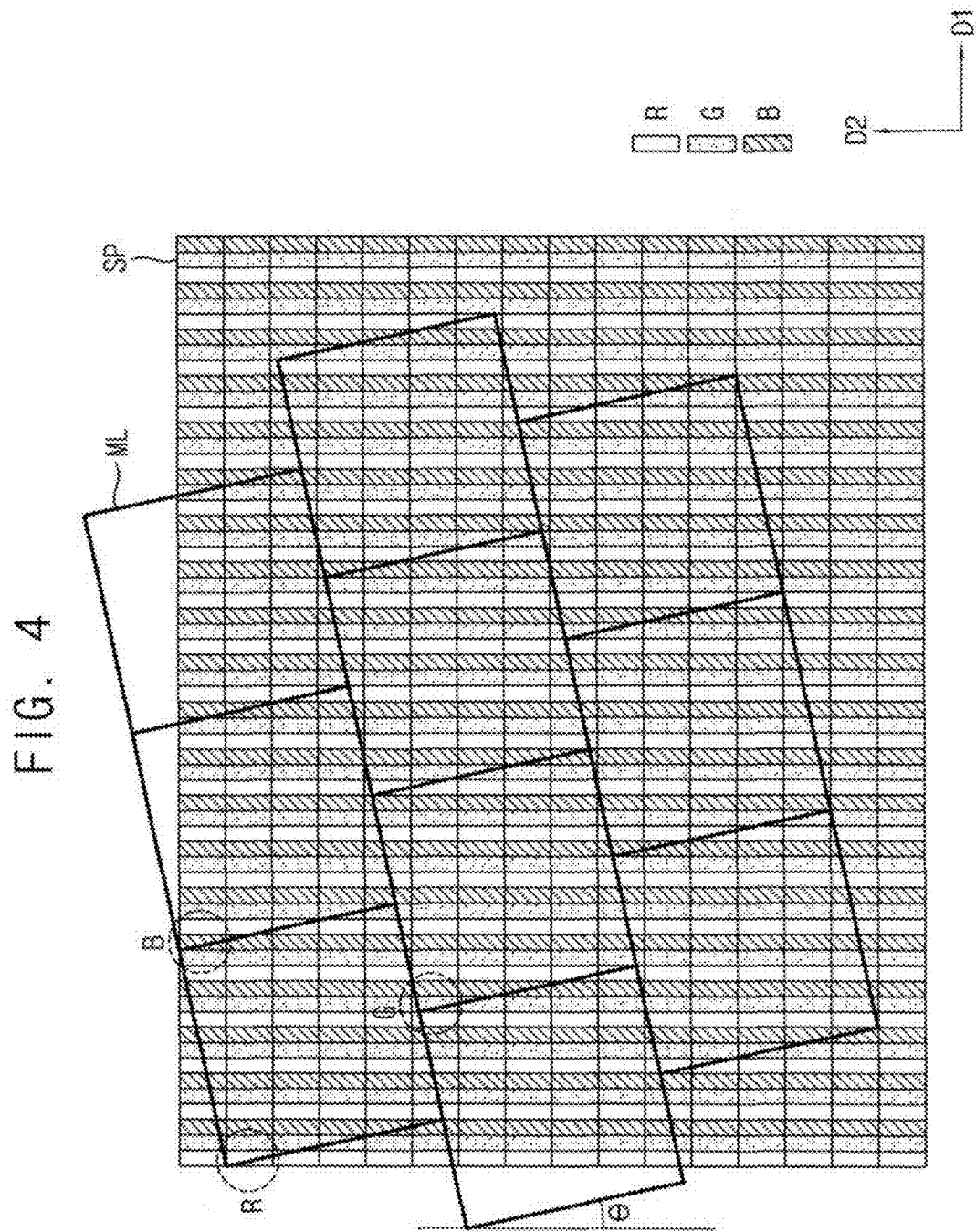

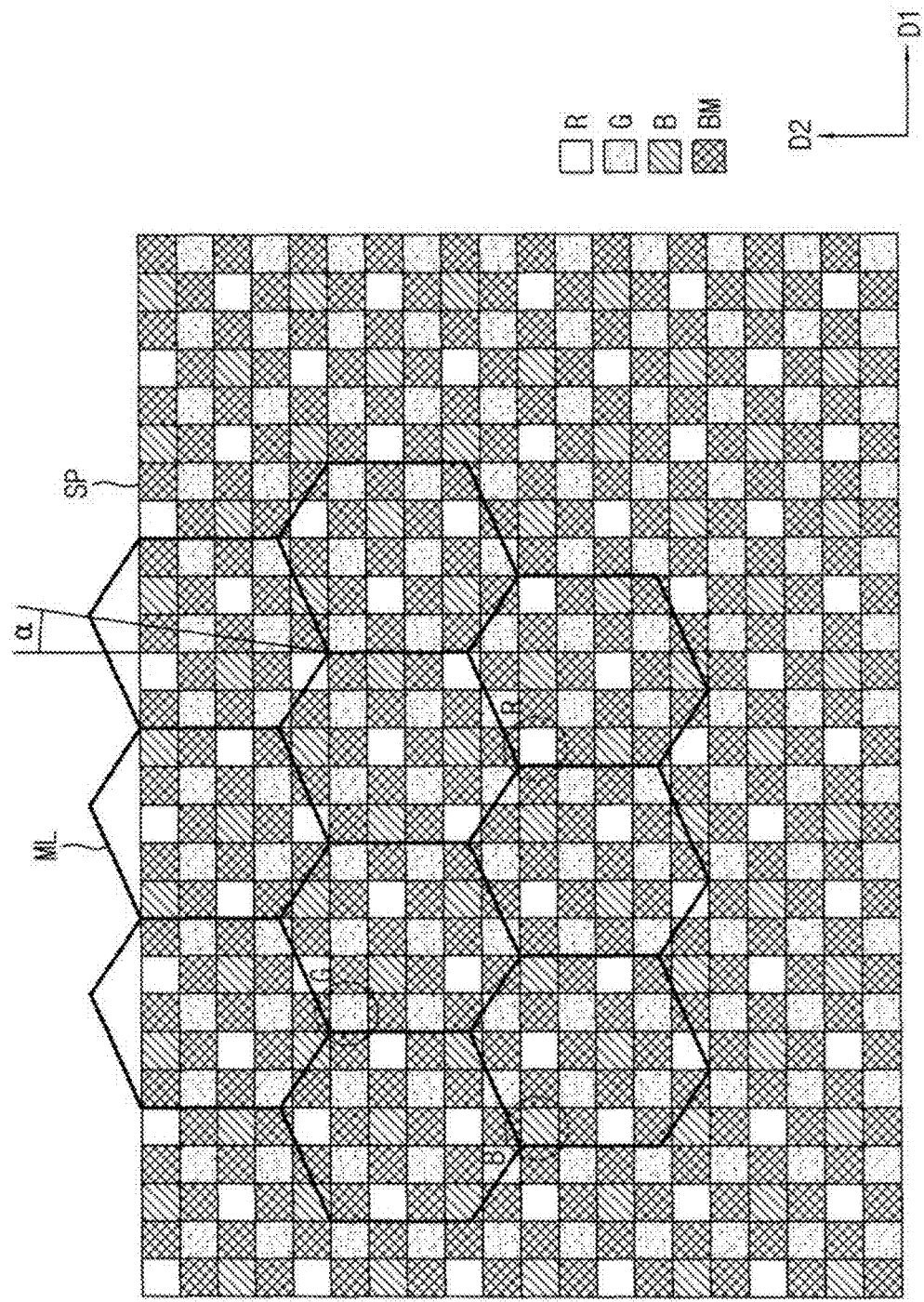

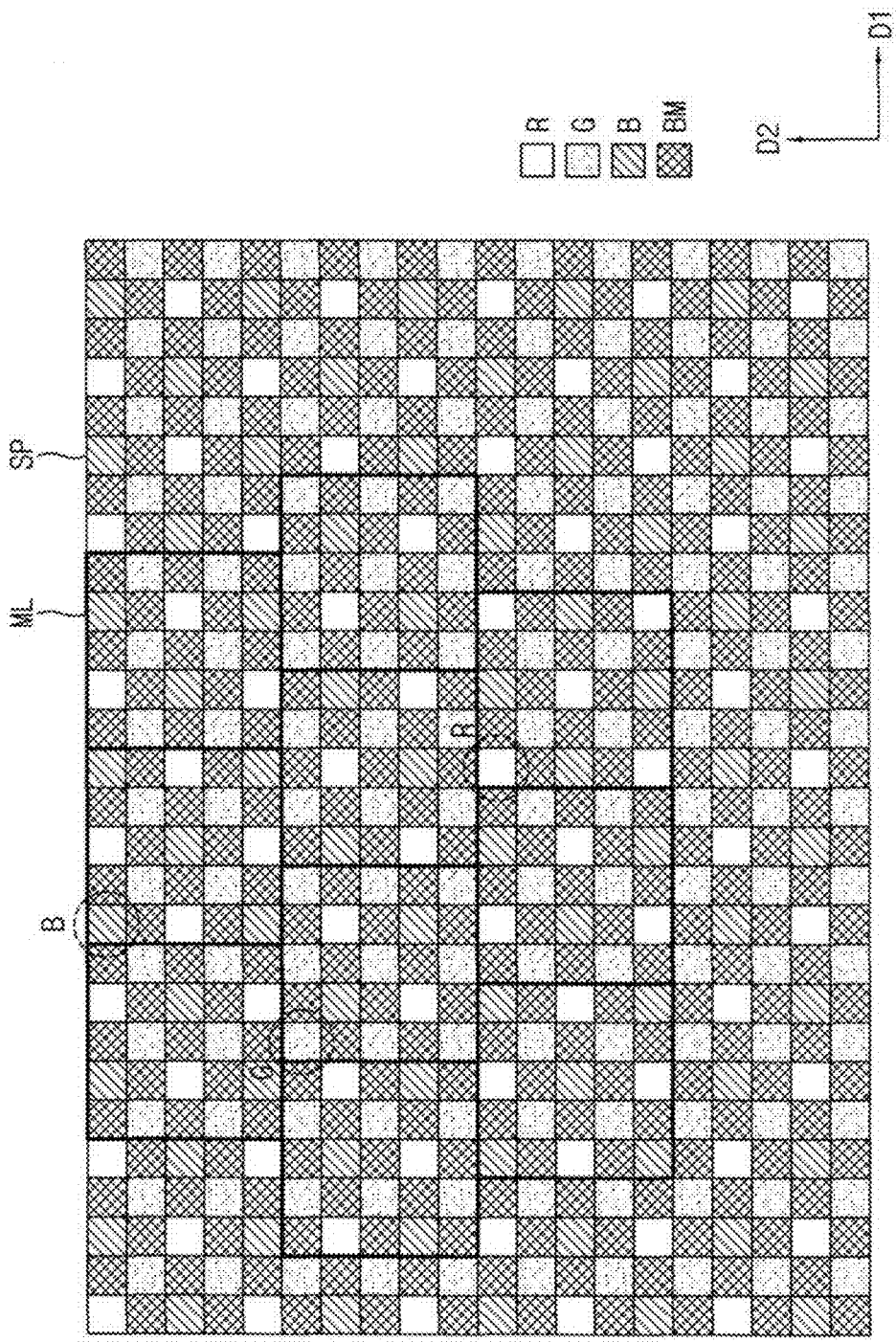

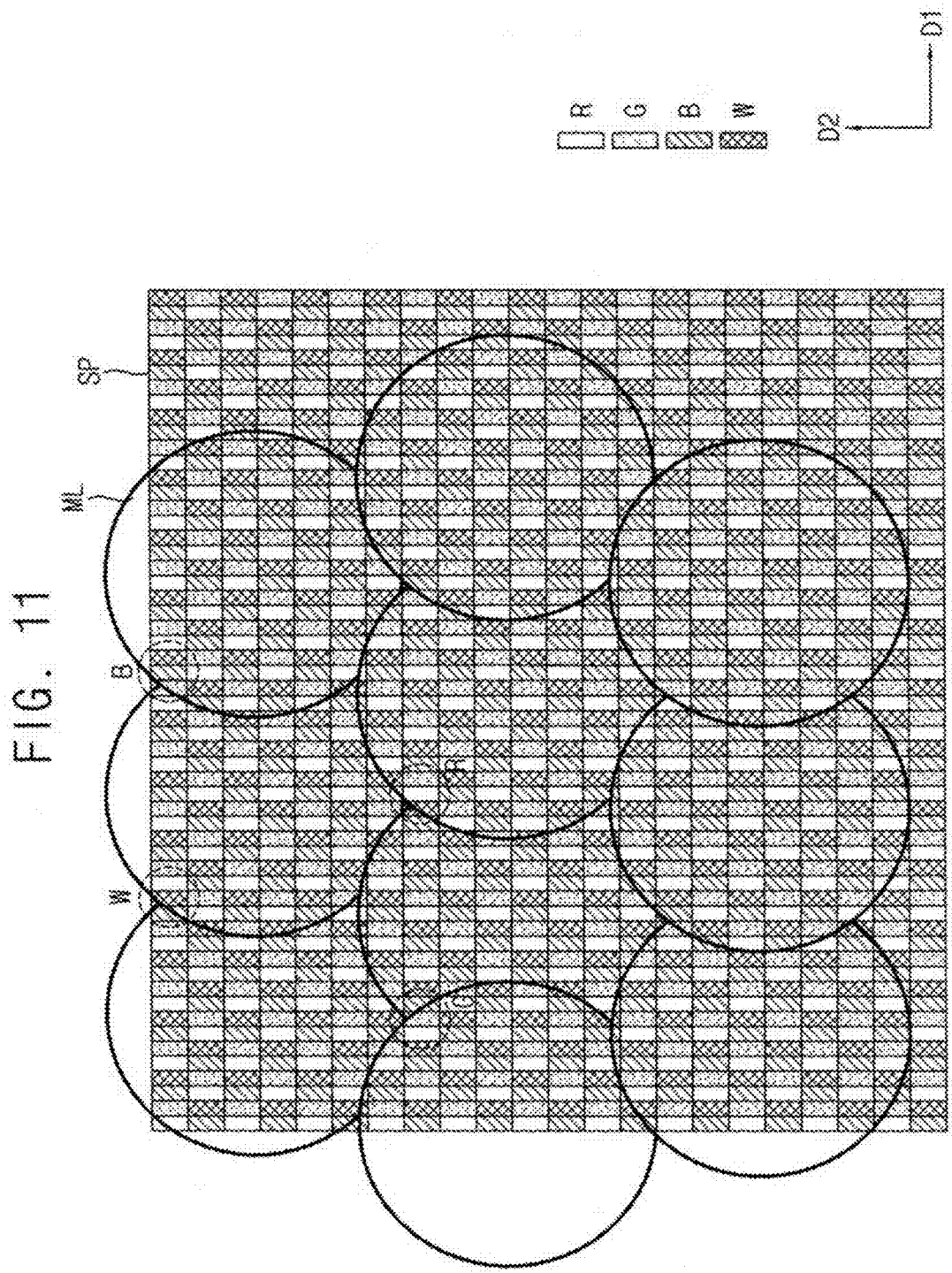

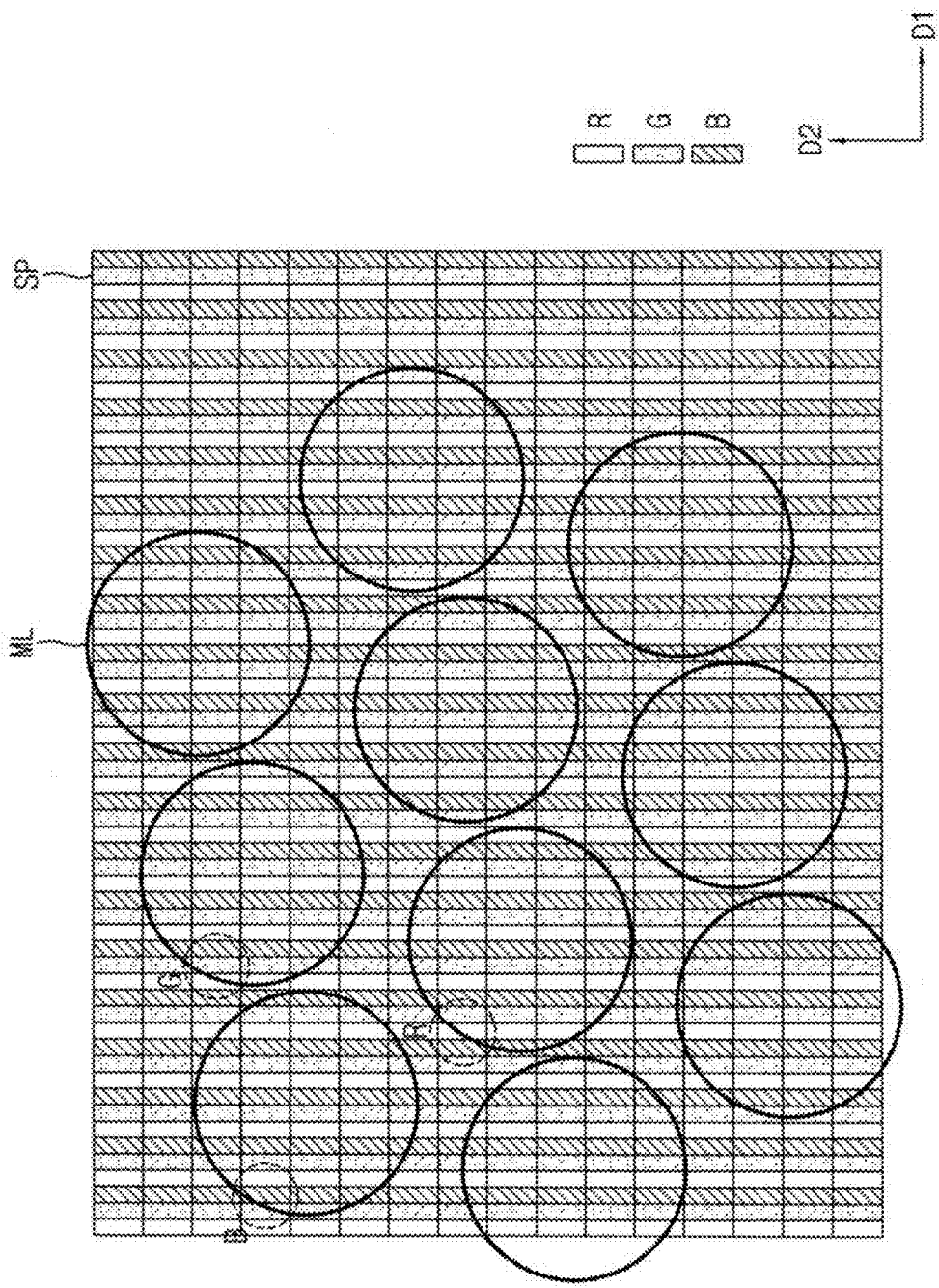

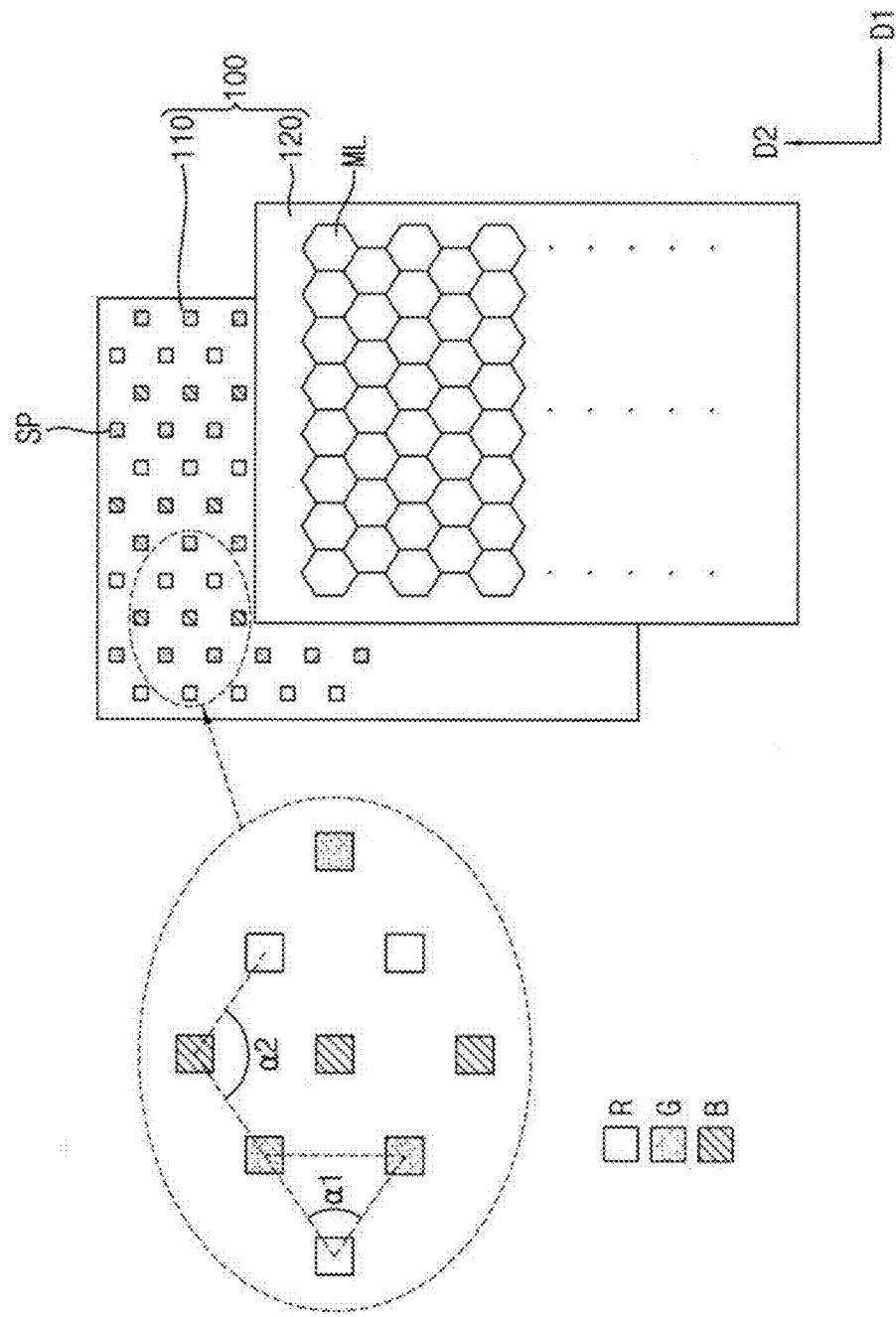

LIGHT FIELD DISPLAY APPARATUS

The present application claims priority to and the benefit of Korean Patent Application No. 10-2016-0142390, filed Oct. 28, 2016, the disclosure of which is incorporated by reference herein in its entirety.

TECHNICAL FIELD

The present disclosure relates to a display apparatus, and more specifically, to a light field display apparatus.

DISCUSSION OF THE RELATED ART

Display apparatuses, such as a movie projector, a television (TV), a mobile phone, and the like, may be configured to display either a conventional two-dimensional image or a three-dimensional (3D) image. 3D display technology may be able to provide a user the feeling of being immersed within a virtual environment by providing a stereoscopic effect that is similar to how objects are normally viewed in the real environment. A variety of types of techniques are used to provide stereoscopic display. A light field method, among the various techniques, may express 3D spatial information more accurately in comparison to a more traditional stereo method or a multiview method.

SUMMARY

A light field display apparatus includes a display panel and a micro lens array. The display panel includes a plurality of sub-pixels arranged in a matrix. The micro lens array is disposed on the display panel. The micro lens array includes a plurality of micro lenses. Each of the plurality of sub pixels emits light of a single color, of a set of primary colors. The arrangement of the micro lens array, relative to the display panel, causes the light of certain sub pixels, of the plurality of sub pixels to be emphasized. The micro lens array is arranged, relative to the display panel, so that sub pixels of each primary color are emphasized to a same extent.

A light field display apparatus includes a display panel and a micro lens array. The display panel includes a plurality of sub-pixels arranged in a matrix form. The micro lens array is disposed on the display panel. The micro lens array includes a plurality of micro lenses. Each of the plurality of sub-pixels emits light of a single color, of a set of primary color. The light of the sub-pixels corresponding to same positions of three or four micro lenses which are make contact to each other, combines to form white light, or the light of the sub-pixels corresponding to same positions of three micro lenses, includes two micro lenses contacting each other and one micro lenses spaced apart from the two micro lenses by one micro lens, combines to form white.

BRIEF DESCRIPTION OF THE DRAWINGS concept more complete appreciation of the present disclosure and many of the attendant aspects thereof will become more apparent as the same becomes better understood by reference to the following detailed description when considered in connection with the accompanying drawings, in which:

FIG. 2 is a plan view illustrating a light field display apparatus according to an exemplary embodiment of the inventive concept;

FIG. 3 is a plan view illustrating a light field display apparatus according to an exemplary embodiment of the inventive concept;

FIG. 4 is a plan view illustrating a light field display apparatus according to an exemplary embodiment of the inventive concept;

FIG. 5A is a plan view illustrating a light field display apparatus according to an exemplary embodiment of the inventive concept;

FIG. 6 is a plan view illustrating a light field display apparatus according to an exemplary embodiment of the inventive concept;

FIG. 11 is a plan view illustrating a light field display apparatus according to an exemplary embodiment of the inventive concept;

FIG. 12 is a plan view illustrating a light field display apparatus according to an exemplary embodiment of the inventive concept;

FIG. 14A is a schematic view illustrating a light field display apparatus according to an exemplary embodiment of the inventive concept.

DETAILED DESCRIPTION

Figure 1A:
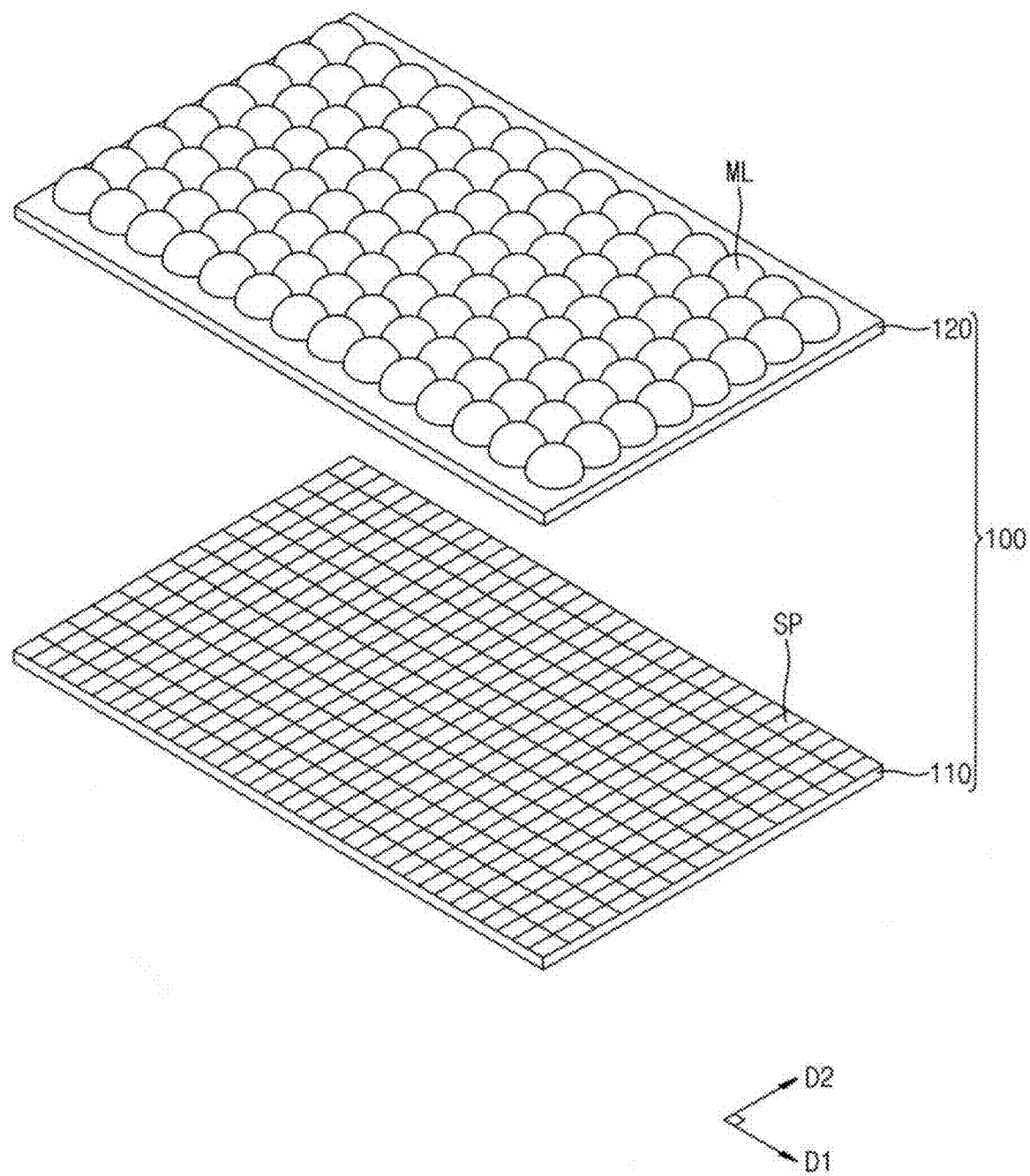
FIG. 1A is an exploded perspective view illustrating a light field display apparatus according to an exemplary embodiment of the inventive concept.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

FIG. 1A is an exploded perspective view illustrating a light field display apparatus according to an exemplary embodiment of the inventive concept.

Referring to FIG. 1A, the light field display apparatus 100 may include a display panel 110 and a micro lens array 120.

The display panel 110 may include a plurality of pixels. Each of the plurality of pixels may include a plurality of sub-pixels SP. The sub-pixels SP may include, for example, red sub-pixels R, green sub-pixels G, and blue sub-pixels B, although other colored sub-pixels may be used. The sub-pixels SP may be arranged in a matrix form in a first direction D1 and a second direction D2, which is substantially perpendicular to the first direction D1. For example, the sub-pixels SP may be arranged in an orthogonal matrix of rows and columns.

The display panel 110 may be a plasma display panel, a liquid crystal display panel, an organic light emitting display panel, etc.

The micro lens array 120 may be disposed on the display panel 110 such that the display panel 110 is viewable by a user through the micro lens array 120. The micro lens array 120 may include a plurality of micro lenses ML. Light from the sub-pixels SP of the display panel 110 may pass the micro lenses ML of the micro lens array 120 and may thereby generate a light field.

An arrangement of the sub-pixels SP of the display panel 110, an arrangement of the micro lenses ML of the micro lens array 120, and relative positions of the sub-pixels SP and the micro lenses ML will be described in detail with reference to FIGS. 2 to 14B.

Figure 1B:
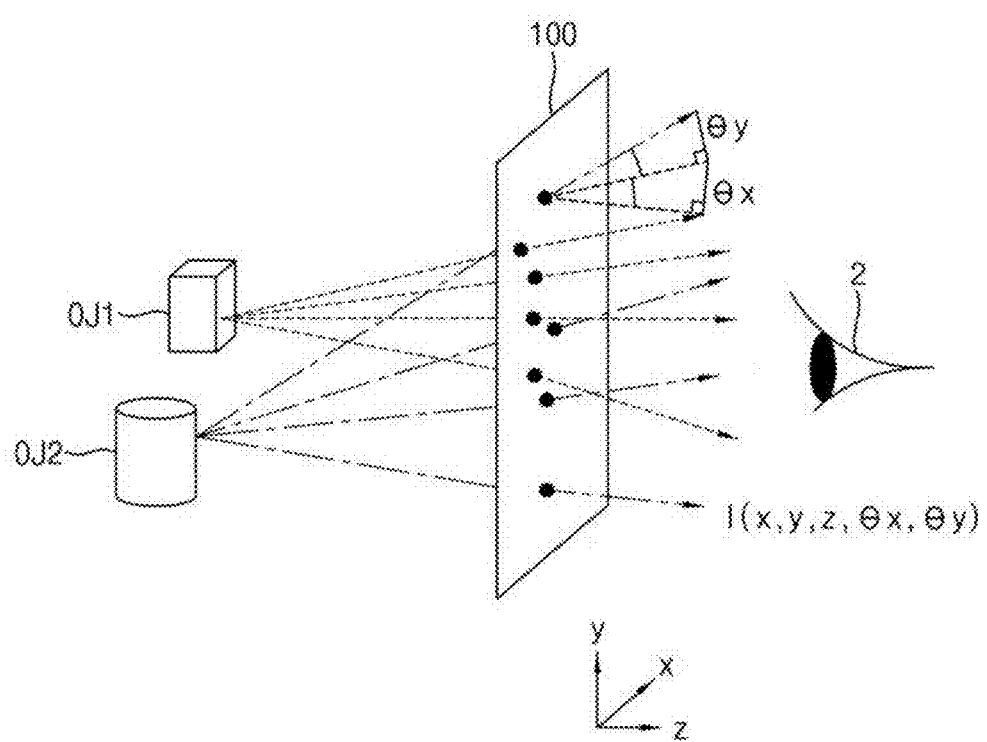
FIG. 1B is a conceptual diagram illustrating a user viewing a stereoscopic image using the light field display apparatus of FIG. 1A.

FIG. 1B is a conceptual diagram illustrating a user viewing a stereoscopic image using the light field display apparatus of FIG. 1A.

Referring to FIG. 1B, the phrase "light field" refers to a distribution state of light in a space expressed by a distribution of light rays. According to the concept of the light field, light reflected off of or generated from an object advances in a straight line in space and enter a human eye. A 3-dimensional (3D) space may include a great number of light fields. For example, a 5-dimensional (5D) plenoptic function may be used to mathematically express individual light fields. For example, the light field may be indicated by a 3D spatial coordinate (x, y, z, θx, θy) of a point at which a light ray passes through a particular plane in space and by brightness related to a space direction angle (θx, θy) to which the light ray is directed. The light field may be captured by expressing plenoptic function values of light passing through the particular plane in the form of data. For example, the light field may be expressed by brightness values per space direction angle (θx, θy) with respect to the coordinates (x, y, z) in a predetermined region. A light field camera refers to a camera adapted to capture a light field. Whereas a 2D camera is adapted to record brightness values per space direction angle (θx, θy) with respect to one particular point in space, the light field camera may record brightness values per space direction angle (θx, θy) with respect to all coordinate values in the predetermined region.

A user 2 can view a 3D image of the objects OJ1 and OJ2, since the light field obtained by the light field camera is displayed on the light field display apparatus 100. Since the light field display apparatus 100 may create the light field, the user 2 may view 3D images that appear to change with the movement of the user 2. Thus, it is possible to view realistic 3D, image as compared with the 3D image display apparatus of the conventional stereo system or multi-view system.

Figure 1C:
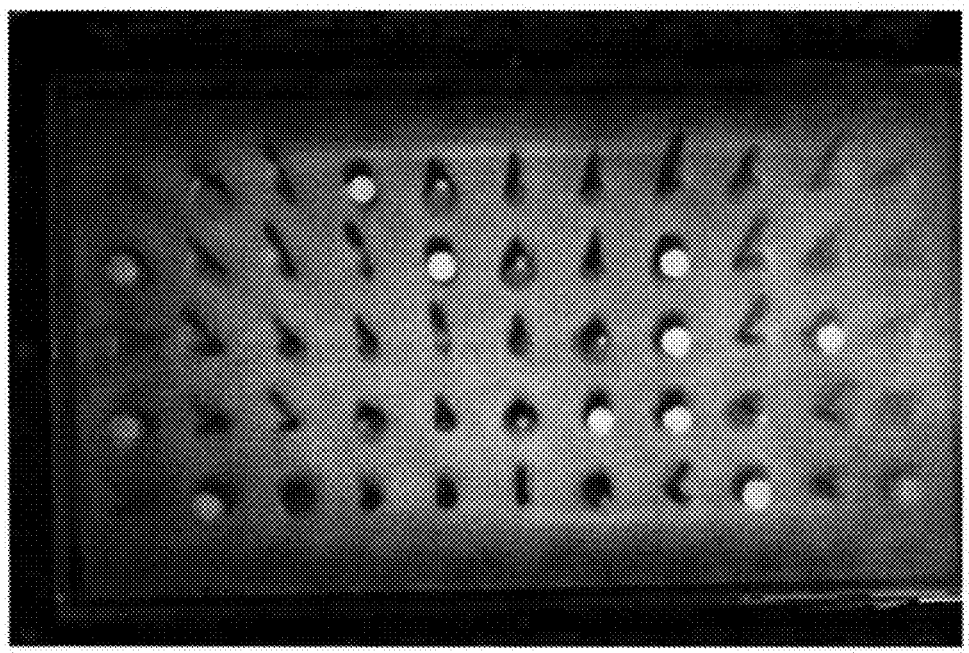
FIG. 1C is a photograph of a stereoscopic image displayed on the light field display apparatus of FIG. 1A.

FIG. 1C is a photograph of a stereoscopic image displayed on the light field display apparatus of FIG. 1A.

FIG. 2 is a plan view illustrating a light field display apparatus according to an exemplary embodiment of the inventive concept.

Referring to FIG. 2, the light field display apparatus may include a display panel including a plurality of sub-pixels SP and a micro lens array including a plurality of micro lenses ML.

The sub-pixels SP may be arranged in a matrix form in a first direction D1 and a second direction D2 which is substantially perpendicular to the first direction D1. Although, in the figure, lines are shown as separating adjacent sub-pixels SP, a black matrix which blocks light may be formed between the adjacent sub-pixels SP.

The sub-pixels SP may include a plurality of red sub-pixels R, which emits red light, a plurality of green sub-pixels G, which emits green light, and a plurality of blue sub-pixels B, which emits blue light (e.g. an RGB structure). The red sub-pixel R, the green sub-pixel G and the blue sub-pixel B may be alternately and repeatedly arranged along the first direction D1. The red sub-pixels R may be continuously arranged along the second direction D2. The green sub-pixels G may be continuously arranged along the second direction D2. The blue sub-pixels B may be continuously arranged along the second direction D2. Thus, the red sub-pixels R, the green sub-pixels G, and the blue sub-pixels B may be arranged in a stripe pattern, as show, although other arrangements may be used.

Each of the micro lenses ML may have a hexagonal shape. The hexagonal shape may be symmetrical, and the length of two sides may be longer than length of the other four sides. In some exemplary embodiments of the present invention, the hexagonal shape may be that of a regular hexagon. In some exemplary embodiments of the present invention, the hexagonal shape may be symmetrical, and length of two sides may be shorter than length of the other four sides. In some exemplary embodiments of the present invention, the hexagonal shape may have the same length of two sides and be asymmetric, for example, as may be seen in the lens shape of FIG. 5A. The micro lenses ML may be arranged so that adjacent sides thereof contact with each other to form a honeycomb structure. The micro lenses ML may be arranged at a tilt angle θ with respect to the first direction D1 and the second direction D2, respectively. For example, one side of the micro lens ML may be inclined by the tilt angle θ with respect to the second direction D2.

The tilt angle θ may be determined by the following equation 1.

$$\text{tilt angle } \theta = \tan^{-1}[(\text{sub-pixel vertical pitch})/((\text{number of horizontal viewpoints})*(\text{sub-pixel horizontal pitch})]. \quad [\text{equation 1}]$$

Here, the sub-pixel vertical pitch is defined as a distance in the second direction between centers of the two adjacent sub-pixels, the sub-pixel horizontal pitch is defined as a distance in the first direction between centers of the two adjacent sub-pixels, and the number of horizontal viewpoints (see below) is defined as the number of sub-pixels in a horizontal pitch.

The horizontal pitch of the micro lens ML is defined as a distance in the first direction D1 between centers of the two adjacent micro lenses. A vertical pitch of the micro lens ML is defined as a distance in the second direction D2 between centers of the two adjacent micro lenses.

The number of horizontal viewpoints may be 2n+2 (where n=1, 2, 3 . . . ). Thus, the number of horizontal viewpoints may be 4, 6, 8, . . . . According to one exemplary embodiment of the present invention, the number of horizontal viewpoints may be 14. The number of horizontal viewpoints may be determined in relation to the number of sub-pixels SP constituting one unit pixel. Thus, since the red sub-pixel, the green sub-pixel, and the blue sub-pixel, for example, the three sub-pixels form one unit pixel, the number of horizontal viewpoints is an even number. Otherwise, the sub-pixels of the same color are located at the same position of the repeated micro lenses, and the user may see a distorted stereoscopic image emphasizing a specific color.

A number of vertical viewpoints may be determined according to horizontal and vertical pitches of each sub-pixel and the number of sub-pixels constituting the unit pixel. For example, in the case of the RGB structure, one unit pixel is composed of three sub-pixels, the vertical pitch of one sub-pixel may be three times that of the horizontal pitch of the one sub-pixel. In this case, the number of vertical viewpoints may be a positive integer close to the number of horizontal viewpoints divided by 3. According to one exemplary embodiment of the present invention, the number of vertical viewpoints is 5, which is the closest positive integer to 14 (the number of horizontal viewpoints)/3=4.67.

According to an exemplary embodiment of the present invention, in the three micro lenses, each of which is in contact with each other, the mixed color light of the same portion of each micro lens, for example, the sub-pixels corresponding to the same position of each micro lens, may be white. Thus, the sub-pixels corresponding to an upper left corner (the dotted circle in the drawing) of the three micro lenses closest to each other in the drawing are red sub-pixel R, green sub-pixel (i, blue sub-pixel B. And the mixed color light of these can be white. The light field display apparatus can be driven such that the three sub-pixels constituting white form one unit pixel.

According to an exemplary embodiment of the present invention, in the light field display apparatus, since the sub-pixels emitting different color light correspond to the same positions of the micro lenses, respectively, the user can view a natural 3D image in which a specific color is not emphasized over the other colors.

FIG. 3 is a plan view illustrating a light field display apparatus according to an exemplary embodiment of the present inventive concept.

Referring to FIG. 3, the light field display apparatus may be substantially the same as the light field display apparatus of FIG. 2, except for a shape of a micro lens ML. Thus, any omitted details may be assumed to be similar to or identical to details previously described with respect to the prior figures.

The light field display apparatus may include a display panel including a plurality of sub-pixels SP and a micro lens array including a plurality of micro lenses ML.

The sub-pixels SP may be arranged in a matrix form in a first direction D1 and a second direction D2 which is substantially perpendicular to the first direction D1.

The sub-pixels SP may include a plurality of red sub-pixels R, which emits red light, a plurality of green sub-pixels G, which emits green light, and a plurality of blue sub-pixels B, which emits blue light. The red sub-pixel R, the green sub-pixel G and the blue sub-pixel B may be repeatedly arranged along the first direction D1 and each of the sub-pixels having same color may be arranged in the second direction to from a stripe pattern.

The micro lens ML may have a circular or elliptical shape. The circular or elliptical shape may be formed by depression of either one of the two micro lenses ML adjacent to each other to maximize a fill factor of the micro lenses ML. Thus, some of the edges of the circular or elliptical shape may have a recessed shape. The fill factor refers to a ratio of area actually occupied by the micro lenses in a plane on which the micro lenses are formed. According to some exemplary embodiments of the present invention, since there is no empty space between the micro lenses ML, the fill factor becomes 1.

The micro lenses ML may be arranged at a tilt angle θ with respect to the first direction D1 and the second direction D2, respectively.

The tilt angle θ may be determined by the above equation 1.

According to some exemplary embodiments of the present invention, the number of horizontal viewpoints of the micro lens ML is 14 and the number of vertical viewpoints is 5.

According to an exemplary embodiment of the present invention, in the three micro lenses, each of which is in contact with each other, the mixed color light of the same portion of each micro lens, for example, the sub-pixels corresponding to the same position of each micro lens, may be white. Thus, the sub-pixels corresponding to an upper left corner (e.g. the dotted circle in the drawing) of the three micro lenses closest to each other in the drawing are red sub-pixel R, green sub-pixel G, blue sub-pixel B. And the mixed color light of these can be white.

FIG. 4 is a plan view illustrating a light field display apparatus according to an exemplary embodiment of the present inventive concept.

Referring to FIG. 4, the light field display apparatus may be substantially the same as the light field display apparatus of FIG. 2, except for a shape of a micro lens ML. Thus, any omitted details may be assumed to be similar to or identical to details previously described with respect to the prior figures.

The light field display apparatus may include a display panel including a plurality of sub-pixels SP and a micro lens array including a plurality of micro lenses ML.

The sub-pixels SP may be arranged in a matrix form in a first direction D1 and a second direction D2, which is substantially perpendicular to the first direction D1.

The sub-pixels SP may include a plurality of red sub-pixels R, which emits red light, a plurality of green sub-pixels G, which emits green light, and a plurality of blue sub-pixels B, which emits blue light. The red sub-pixel R, the green sub-pixel G and the blue sub-pixel B may be repeatedly and alternately arranged along the first direction D1 and each of the sub-pixels having same color may be arranged in the second direction to form a stripe pattern.

The micro lenses ML may each have a quadrangle shape. The quadrangle shape may be a square. In some exemplary embodiments of the present invention, the quadrangle shape may be a rectangle.

Edges of the micro lenses ML may be staggered so as to correspond to a center (or an intermediate portion excluding both ends) of one side of the adjacent micro lens, which is adjacent to the micro lenses ML in the second direction. The micro lenses ML may be arranged at a tilt angle θ with respect to the first direction D1 and the second direction D2, respectively. For example, one side of the micro lens ML may be inclined by the tilt angle θ with respect to the second direction D2.

The tilt angle θ may be determined by the above equation 1.

According to an exemplary embodiment of the present invention, a number of horizontal viewpoints of the micro lens ML is 14 and a number of vertical viewpoints is 5.

According to an exemplary embodiment of the present inventive concept, in the three micro lenses, each of which is in contact with each other, the mixed color light of the same portion of each micro lens, for example, the sub-pixels corresponding to the same position of each micro lens, may be white. Thus, the sub-pixels corresponding to an upper left corner (the dotted circle in the drawing) of the three micro lenses closest to each other in the drawing are red sub-pixel R, green sub-pixel G, blue sub-pixel B. And the mixed color light of these can be white.

FIG. 5A is a plan view illustrating a light field display apparatus according to an exemplary embodiment of the inventive concept.

Referring to FIG. 5A, the light field display apparatus may include a display panel including a plurality of sub-pixels SP and a micro lens array including a plurality of micro lenses ML.

The sub-pixels SP may be arranged in a matrix form in a first direction D1 and a second direction D2, which is substantially perpendicular to the first direction D1. A black matrix BM may be disposed between the sub-pixels SP of the display panel. Light is not emitted in an area where the black matrix is disposed, and the black matrix BM may alternately be formed between the sub-pixels SP adjacent in the first direction (D1) and the second direction (D2). Accordingly, the black matrix BM may be formed corresponding to an area of one half of the display panel. In addition, although only a line is shown between adjacent sub-pixels SP in the figures, the black matrix, which blocks light, may also be formed between the adjacent sub-pixels SP.

The sub-pixels SP may include a plurality of red sub-pixels R, which emits red light, a plurality of green sub-pixels G, which emits green light, and a plurality of blue sub-pixels B, which emits blue light. In (n)th row, the red sub-pixel R, the black matrix BM, the blue sub-pixel B and the black matrix BM may be repeatedly arranged in the first direction D1. In the (n+1) th row, the black matrix BM and the green sub-pixel G may be repeatedly arranged in the first direction D1. This arrangement may be referred to as an RGBG pentile structure.

Here, the black matrix BM does not substantially correspond to one sub-pixel, and the sub-pixel is divided into one red, green or blue sub-pixel R, G or B and one adjacent black matrix BM adjacent to the sub-pixel in the second direction D2.

The micro lens ML may have a hexagonal shape. Lengths of the opposite sides of the hexagonal shape may all be the same as each other. Left and right sides of the hexagonal shape may be parallel to the second direction D2 and a line connecting the upper and lower vertices may be inclined at a predetermined angle $\alpha$ with respect to the second direction D2. For example, the micro lens may have an asymmetric hexagonal shape. For example, the predetermined angle $\alpha$ may be determined such that a distance between the upper vertex and lower vertex of the hexagonal shape in the first direction D1 is less than a horizontal pitch of one sub-pixel.

The micro lenses ML may be arranged so that adjacent sides thereof contact with each other to form a honeycomb structure. The micro lenses ML may be arranged in the first direction D1 and the second direction D2.

The number of horizontal viewpoints may be 2n+3. (n=0, 1, 2, 3 . . . ) Thus, the number of horizontal viewpoints may be 3, 5, 7, 9 . . . . According to some exemplary embodiments of the present invention, the number of horizontal viewpoints is 5. The number of horizontal viewpoints may be determined in relation to the number of sub-pixels SP constituting one unit pixel. Thus, since the red sub-pixel, the green sub-pixel, the blue sub-pixel and the green sub-pixel, that is, the two (or four) sub-pixels form one unit pixel, the number of horizontal viewpoints is an odd number. Otherwise, the sub-pixels of the same color are located at the same position of the repeated micro lenses, and the user may see a distorted stereoscopic image emphasizing a specific color.

The number of vertical viewpoints may be determined according to horizontal and vertical pitches of one sub-pixel and the number of sub-pixels constituting the unit pixel. For example, in the case of the RGBG pentile structure, one unit pixel is composed of two (or four) sub-pixels, and one sub-pixel is adjacent to one black matrix (see, for example, BM in FIG. 5A). In this case, the number of vertical viewpoints may be a value of the number of horizontal viewpoints/2.

According to exemplary embodiments of the present invention, the number of horizontal viewpoints is 5 and the number of vertical viewpoints is 2.5.

According to exemplary embodiments of the present invention, in the three micro lenses which are two micro lenses contacting each other and one micro lenses spaced apart from the two micro lenses by one micro lens, the mixed color light of the same portion of each micro lens, for example, the sub-pixels corresponding to the same position of each micro lens, may be white. Thus, the sub-pixels corresponding to an upper left corner (e.g. the dotted circle in the drawing) of the three micro lenses in the drawing are green sub-pixel G, blue sub-pixel B and red sub-pixel R, and the mixed color light of these can be white. The light field display apparatus can be driven such that the three sub-pixels constituting white form one unit pixel.

Figure 5B:
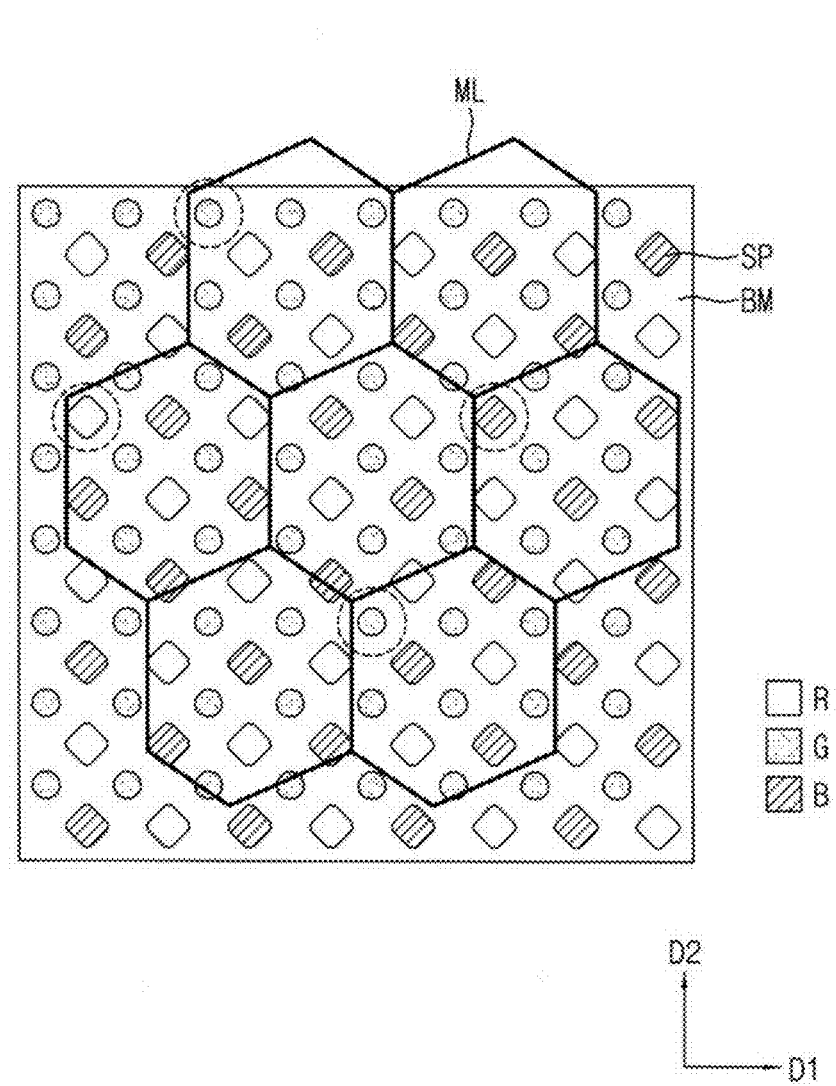
FIG. 5B is a plan view illustrating an example of implementing the light field display apparatus of FIG. 5A.

FIG. 5B is a plan view illustrating an example of implementing the light field display apparatus of FIG. 5A.

Referring to FIG. 5B, the light field display apparatus may include a display panel including a plurality of sub-pixels SP and a black matrix BM between the sub-pixels SP and a micro lens array including a plurality of micro lenses ML.

According to exemplary embodiments of the present invention, a red sub-pixel R, a green sub-pixel G and a blue B may have different shapes, and the black matrix BM may have a single continuous linked structure.

FIG. 6 is a plan view illustrating a light field display apparatus according to an exemplary embodiment of the present inventive concept.

Referring to FIG. 6, the light field display apparatus may be substantially the same as the light field display apparatus of FIG. 5A, except for a shape of a micro lens ML. Thus, any omitted details may be assumed to be similar to or identical to details previously described with respect to the prior figures.

The light field display apparatus may include a display panel including a plurality of sub-pixels SP and a micro lens array including a plurality of micro lenses ML.

The sub-pixels SP may be arranged in RGBG pentile structure.

The micro lens ML may have a quadrangle shape. The quadrangle shape may be a square. Corners of the micro lens ML may be disposed to correspond to one side of adjacent micro lens which is adjacent the micro lens ML in the second direction D2. Here, a distance in the first direction D1 of the left side (or right side) of the two micro lenses separated by one micro lens in the second direction D2 may be the same as a horizontal pitch of one sub-pixel.

According to an exemplary embodiment of the present invention, a number of horizontal viewpoints of the micro lens ML is 5 and a number of vertical viewpoints is 2.5.

According to an exemplary embodiment of the present invention, in the three micro lenses which are two micro lenses contacting each other and one micro lenses spaced apart from the two micro lenses by one micro lens, the mixed color light of the same portion of each micro lens, for example, the sub-pixels corresponding to the same position of each micro lens, may be white. Thus, the sub-pixels corresponding to an upper left corner (e.g. the dotted circle in the drawing) of the three micro lenses in the drawing are blue sub-pixel B, green sub-pixel G, and red sub-pixel R, and the mixed color light of these can be white. The light field display apparatus can be driven such that the three sub-pixels constituting white form one unit pixel.

Figure 7:
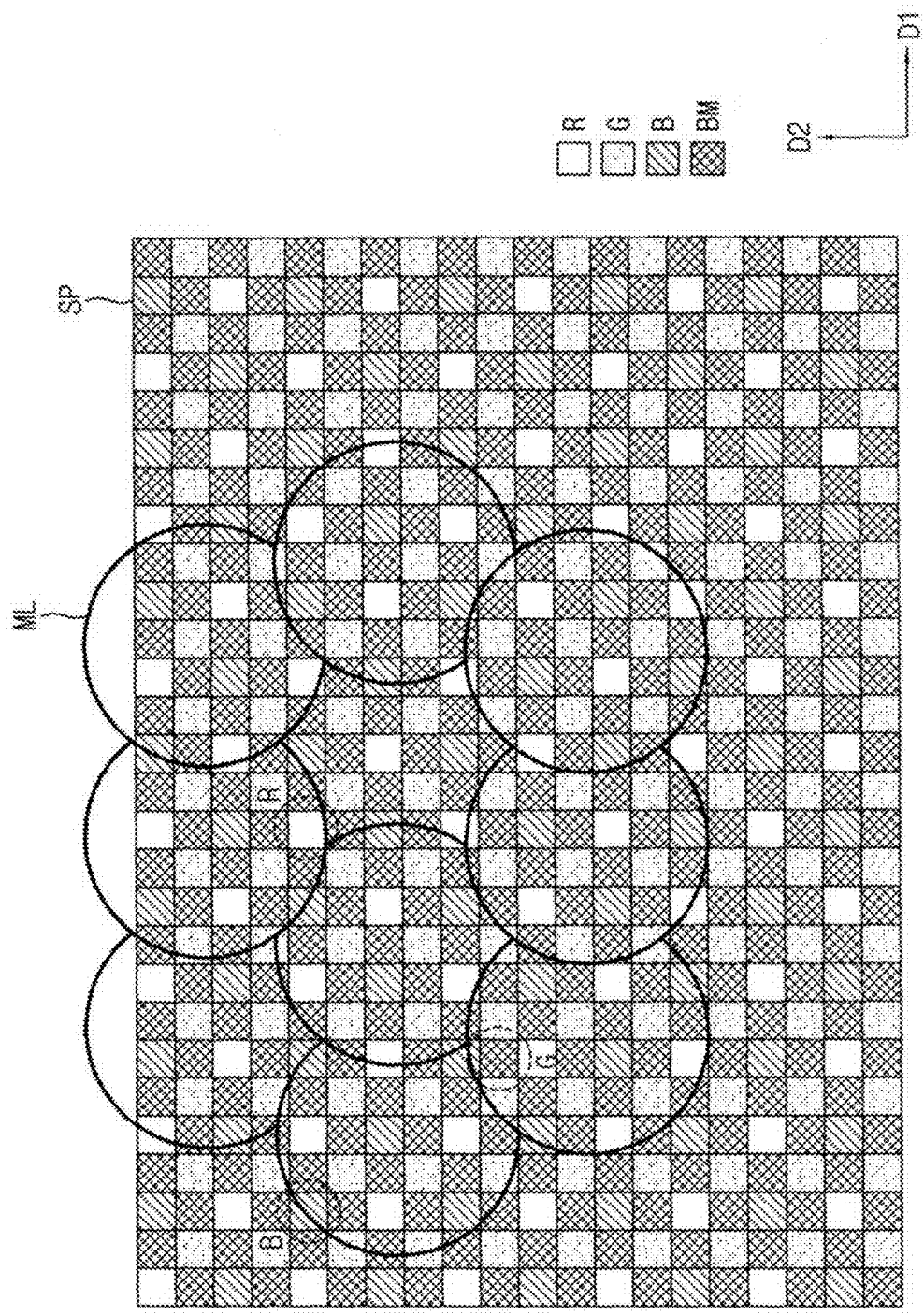
FIG. 7 is a plan view illustrating a light field display apparatus according to an exemplary embodiment of the inventive concept.

FIG. 7 is a plan view illustrating a light field display apparatus according to an exemplary embodiment of the present inventive concept.

Referring to FIG. 7, the light field display apparatus may be substantially the same as the light field display apparatus of FIG. 6, except for a shape of a micro lens ML. Thus, any omitted details may be assumed to be similar to or identical to details previously described with respect to the prior figures.

The light field display apparatus may include a display panel including a plurality of sub-pixels SP and a micro lens array including a plurality of micro lenses ML.

The sub-pixels SP may be arranged in RGBG pentile structure.

The micro lens ML may have a circular or elliptical shape. The circular or elliptical shape may be formed by depression of either one of the two micro lenses ML adjacent to each other to maximize a fill factor of the micro lenses ML.

According to exemplary embodiments of the present invention, a number of horizontal viewpoints of the micro lens ML is 5 and a number of vertical viewpoints is 2.5.

According to an exemplary embodiment of the present invention, in the three micro lenses which are two micro lenses contacting each other and one micro lenses spaced apart from the two micro lenses by one micro lens, the mixed color light of the same portion of each of the micro lenses, for example, the sub-pixels corresponding to the same position of each micro lens, may be white. Thus, the sub-pixels corresponding to an upper left corner (e.g. the dotted circle in the drawing) of the three micro lenses in the drawing are blue sub-pixel B, green sub-pixel G, and red sub-pixel R, and the mixed color light of these can be white.

Figure 8:
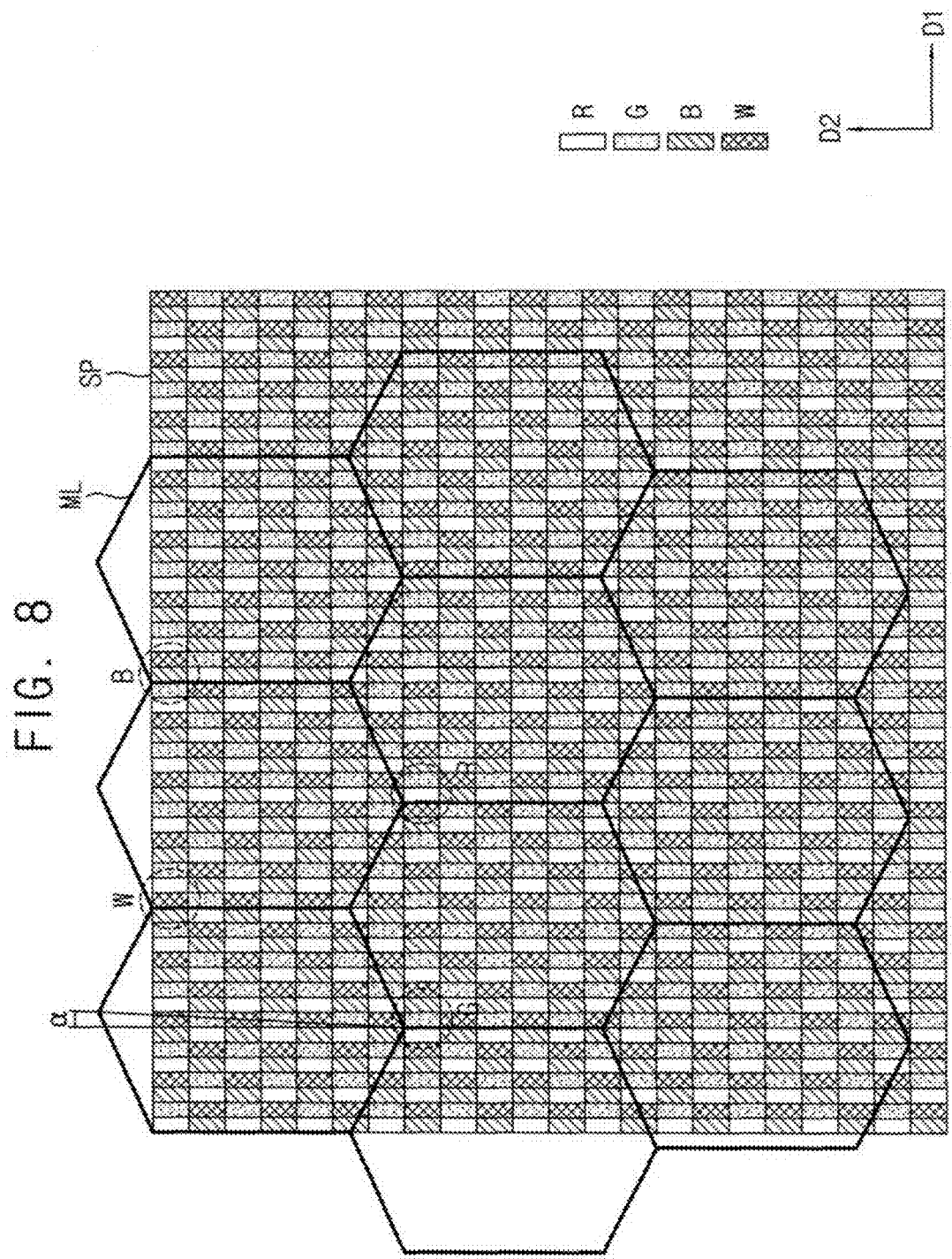
FIG. 8 is a plan view illustrating a light field display apparatus according to an exemplary embodiment of the inventive concept.

FIG. 8 is a plan view illustrating a light field display apparatus according to an exemplary embodiment of the present inventive concept.

Referring to FIG. 8, the light field display apparatus may include a display panel including a plurality of sub-pixels SP and a micro lens array including a plurality of micro lenses ML.

The sub-pixels SP may be arranged in a matrix form in a first direction D1 and a second direction D2 which is substantially perpendicular to the first direction D1. The sub-pixels SP may include a plurality of red sub-pixels R, which emits red light, a plurality of green sub-pixels G, which emits green light, a plurality of blue sub-pixels B, which emits blue light and a plurality of white sub-pixels W, which emits white light. This structure may be referred to herein as an RGBW structure. The red sub-pixel R, the green sub-pixel G, the blue sub-pixel B and the white sub-pixel W may be arranged in a tile form. For example, in (n)th row, the red sub-pixel R, green sub-pixel, the blue sub-pixel B and the white sub-pixel W may be repeatedly arranged in the first direction D1. In the (n+1)th row, the blue sub-pixel B and the white sub-pixel W, the red sub-pixel and the blue sub-pixel B may be repeatedly arranged in the first direction D1.

The micro lens ML may have a hexagonal shape. Lengths of the opposite sides of the hexagonal shape may be the same as each other. Left and right sides of the hexagonal shape may be parallel to the second direction D2 and a line connecting the upper and lower vertices may be inclined at a predetermined angle α with respect to the second direction D2. Accordingly, the micro lens may have an asymmetric hexagonal shape. For example, the predetermined angle α may be determined such that a distance between the upper vertex and lower vertex of the hexagonal shape in the first direction D1 is less than a horizontal pitch of one sub-pixel.

The micro lenses ML may be arranged so that adjacent sides thereof contact with each other to form a honeycomb structure. The micro lenses ML may be arranged in the first direction D and the second direction D2.

In an exemplary embodiment of the present invention, a number of horizontal viewpoints of the micro lens is 15 and a number of vertical viewpoints is 7.

According to an exemplary embodiment of the present invention, in the four micro lenses, each of which is in contact with each other, the mixed color light of the same portion of each micro lens, for example, the sub-pixels corresponding to the same position of each micro lens, may be white. Thus, the sub-pixels corresponding to an upper left corner (e.g. the dotted circle in the drawing) of the four micro lenses closest to each other in the drawing are white sub-pixel W, blue sub-pixel B, green sub-pixel G, and red sub-pixel R. And the mixed color light of these can be white.

Figure 9:
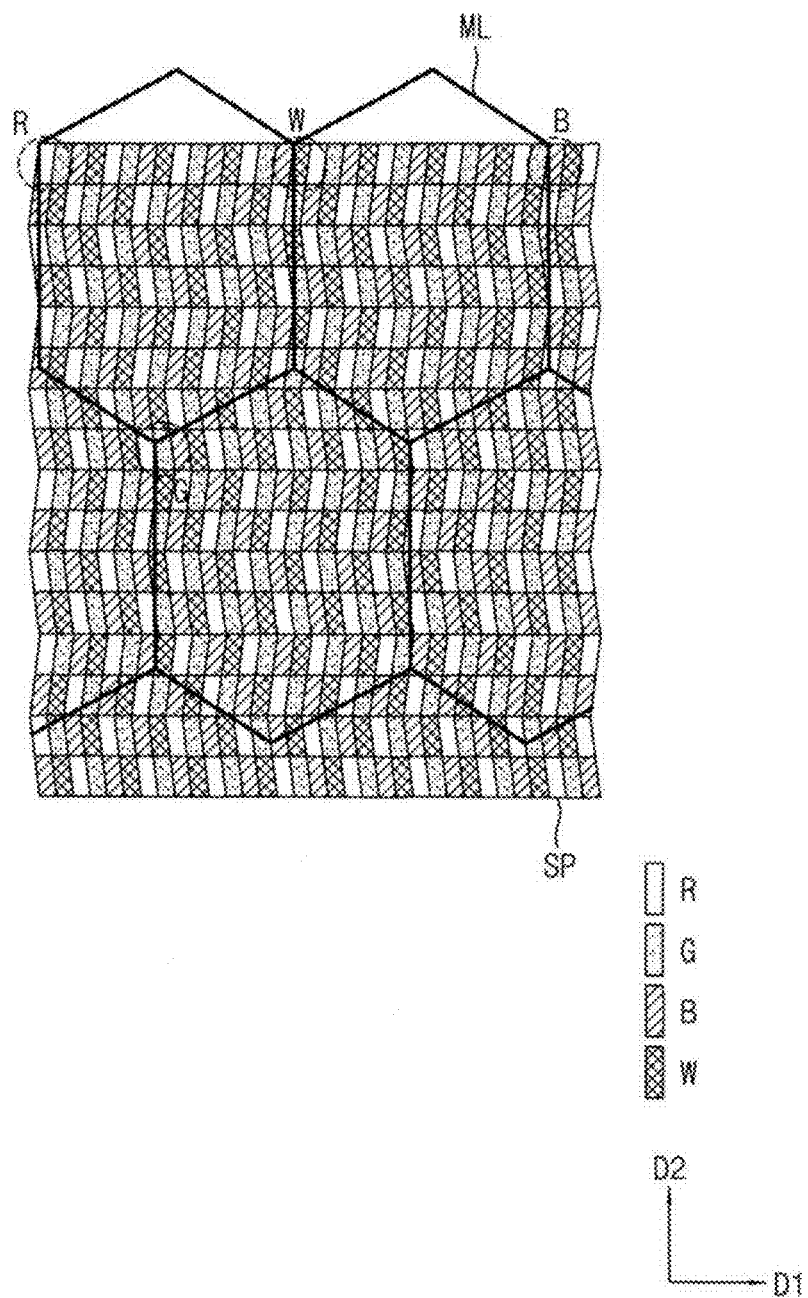
FIG. 9 is a plan view illustrating a light field display apparatus according to an exemplary embodiment of the inventive concept.

FIG. 9 is a plan view illustrating a light field display apparatus according to an exemplary embodiment of the present inventive concept.

Referring to FIG. 9, the light field display apparatus may be substantially the same as the light field display apparatus of FIG. 8, except for a shape of a sub-pixel SP. Thus, any omitted details may be assumed to be similar to or identical to details previously described with respect to the prior figures.

The light field display apparatus may include a display panel including a plurality of sub-pixels SP and a micro lens array including a plurality of micro lenses ML.

The sub-pixels SP may be arranged in a matrix form in a first direction D1 and a second direction D2 which is substantially perpendicular to the first direction D1. The sub-pixels SP may include a plurality of red sub-pixels R, which emits red light, a plurality of green sub-pixels G, which emits green light, a plurality of blue sub-pixels B, which emits blue light and a plurality of white sub-pixels W which emits white light. Here, each of the sub-pixels may be a left or right inclined parallelogram shape. Thus, the sub-pixels SP may be staggered in the second direction D2.

Figure 10:
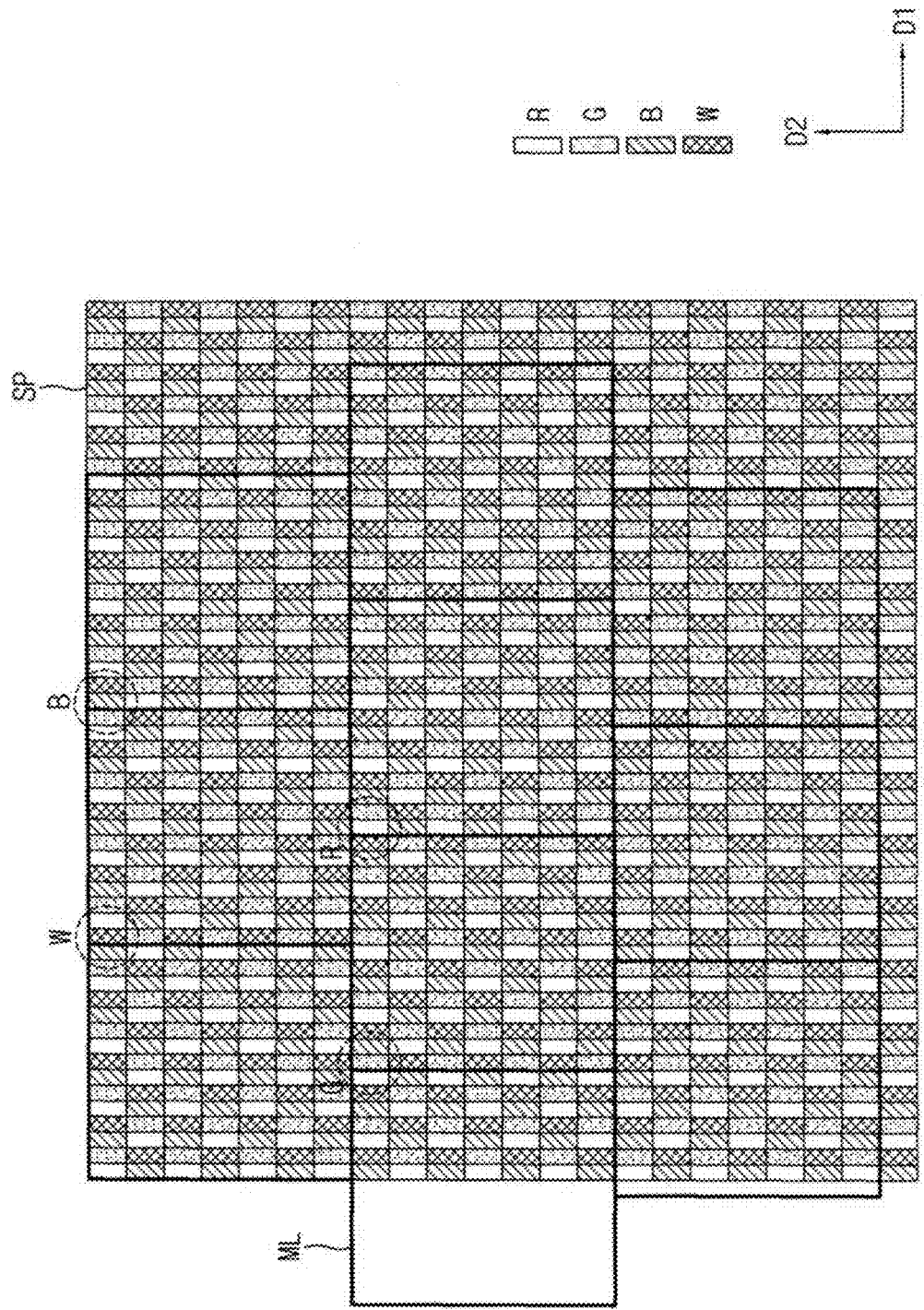
FIG. 10 is a plan view illustrating a light field display apparatus according to an exemplary embodiment of the inventive concept.

FIG. 10 is a plan view illustrating a light field display apparatus according to an exemplary embodiment of the present inventive concept.

Referring to FIG. 10, the light field display apparatus may be substantially the same as the light field display apparatus of FIG. 8, except for a shape of a micro lens ML. Thus, any omitted details may be assumed to be similar to or identical to details previously described with respect to the prior figures.

The micro lens ML may have a quadrangle shape. The quadrangle shape may be a square. In some exemplary embodiments of the present inventive concept, the quadrangle shape may be a rectangle. The micro lenses ML may be arranged in a first direction D1 and a second direction D2. The micro lens ML may be staggered in the second direction D2.

According to exemplary embodiments of the present invention, a number of horizontal viewpoints of the micro lens ML is 15 and the number of vertical viewpoint is 7.

According an exemplary embodiment of the present invention, in the four micro lenses, each of which is in contact with each other, the mixed color light of the same portion of each micro lens, for example, the sub-pixels corresponding to the same position of each micro lens, may be white. Thus, the sub-pixels corresponding to an upper left corner (e.g. the dotted circle in the drawing) of the four micro lenses closest to each other in the drawing are white sub-pixel W, blue sub-pixel B, green sub-pixel G, and red sub-pixel R. And the mixed color light of these can be white.

FIG. 11 is a plan view illustrating a light field display apparatus according to an exemplary embodiment of the present inventive concept.

Referring to FIG. 11, the light field display apparatus may be substantially the same as the light field display apparatus of FIG. 6, except for a shape of a micro lens ML. Thus, any omitted details may be assumed to be similar to or identical to details previously described with respect to the prior figures.

The micro lens ML may have a circular or elliptical shape. The circular or elliptical shape may be formed by depression of either one of the two micro lenses ML adjacent to each other to maximize a fill factor of the micro lenses ML.

According to exemplary embodiments of the present invention, a number of horizontal viewpoints of the micro lens ML is 15 and a number of vertical viewpoints is 7.

According to an exemplary embodiment of the present invention, in the four micro lenses, each of which is in contact with each other, the mixed color light of the same portion of each micro lens, for example, the sub-pixels corresponding to the same position of each micro lens, may be white. Thus, the sub-pixels corresponding to an upper left corner (e.g. the dotted circle in the drawing) of the four micro lenses closest to each other in the drawing are white sub-pixel W, blue sub-pixel B, green sub-pixel G, and red sub-pixel R. And the mixed color light of these can be white.

FIG. 12 is a plan view illustrating a light field display apparatus according to an exemplary embodiment of the present inventive concept.

Referring to FIG. 12, the light field display apparatus may be substantially the same as the light field display apparatus of FIG. 6, except for a shape of a micro lens ML. Thus, any omitted details may be assumed to be similar to or identical to details previously described with respect to the prior figures.

The light field display apparatus may include a display panel including a plurality of sub-pixels SP and a micro lens array including a plurality of micro lenses ML.

The micro lens ML may have a circular shape. The micro lenses may be spaced apart from each other. Since light generated from the sub-pixel at a portion where the micro lens ML is not formed may interfere with a formation of a desired light field for 3D image (e.g. crosstalk), the portion where the micro lens ML is not formed may preferably be minimized. For example, the micro lens ML may have a fill factor of 1, as described above. However, where a micro lens array includes a plurality of circular micro lenses spaced from each other, a position of the micro lens ML and a position of the sub pixel SP can be matched with each other in a similar manner to the case of using an ideal micro lens array, for example, see FIG. 2 or 3, etc.

According to exemplary embodiments of the present invention, in the three micro lenses each of which is in contact with each other, the mixed color light of the same portion of each micro lens, for example, the sub-pixels corresponding to the same position of each micro lens, may be white. Thus, the sub-pixels corresponding to an upper left corner (e.g. the dotted circle in the drawing) of the three micro lenses closest to each other in the drawing are blue sub-pixel B, green sub-pixel G, and red sub-pixel R. And the mixed color light of these can be white.

Figure 13A:
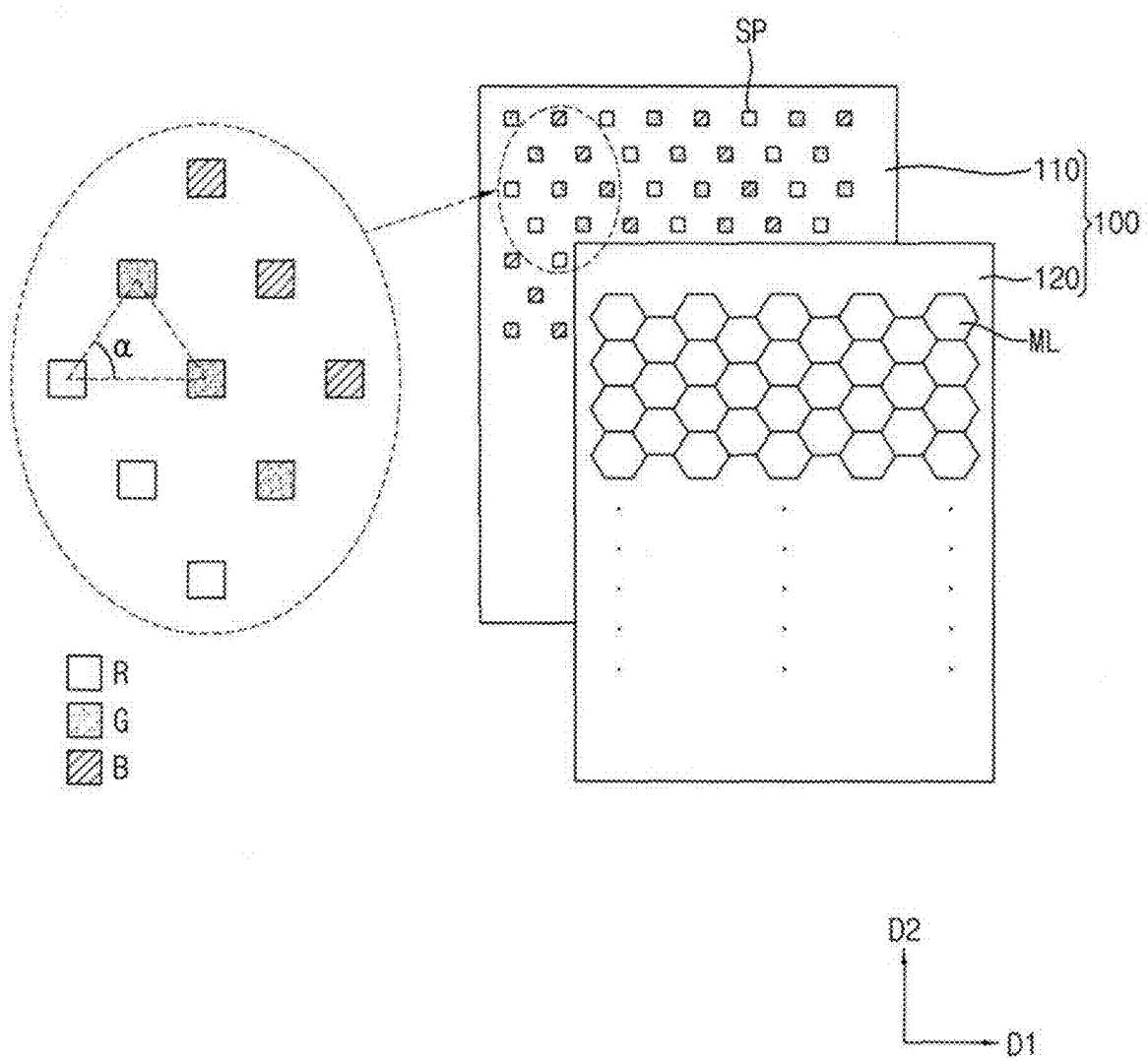
FIG. 13A is a schematic view illustrating a light field display apparatus according to an exemplary embodiment of the inventive concept.
Figure 13B:
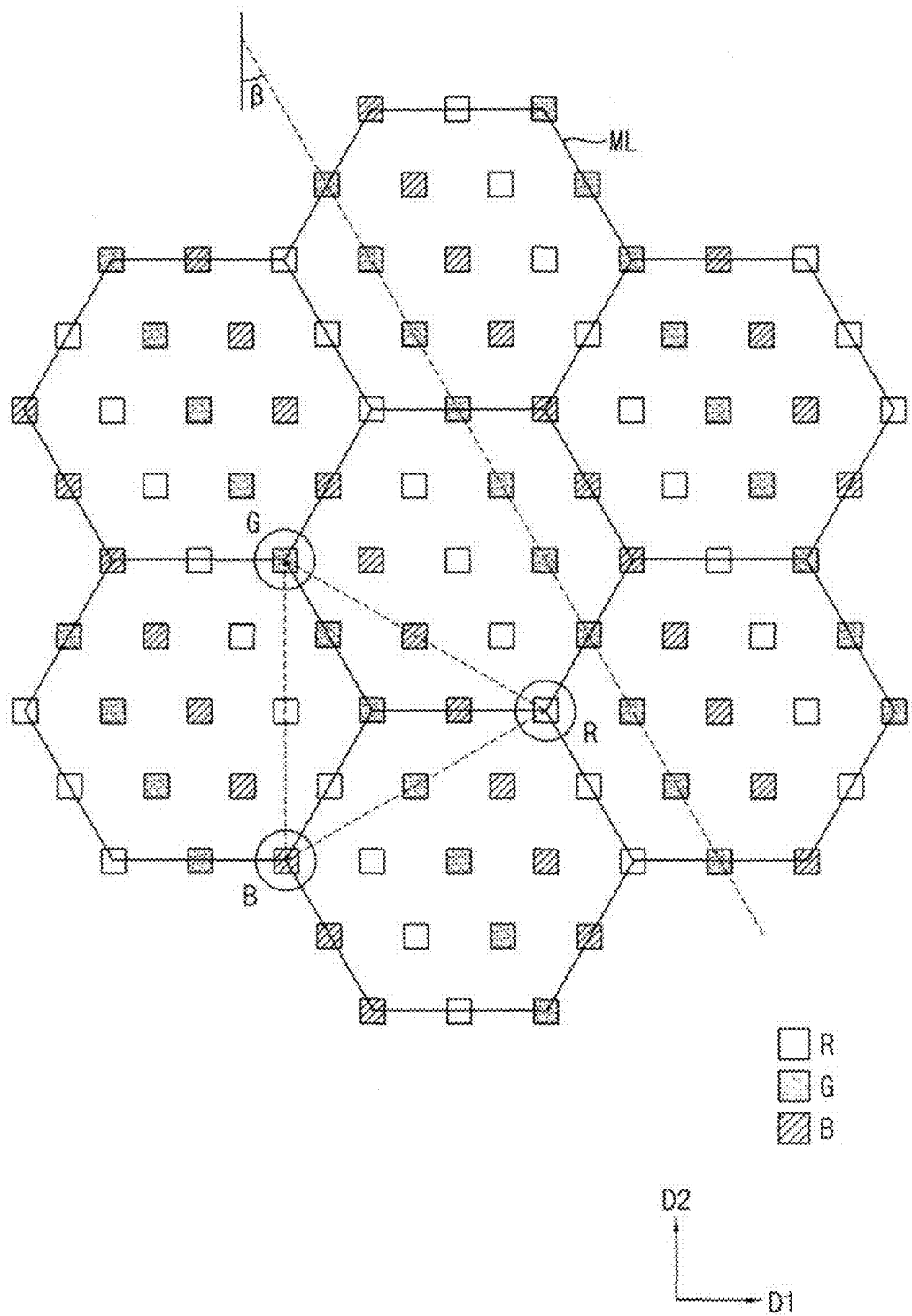
FIG. 13B is a plan view of the light field display apparatus of FIG. 13A.

FIG. 13A is a schematic view illustrating a light field display apparatus according to an exemplary embodiment of the present inventive concept. FIG. 13B is a plan view of the light field display apparatus of FIG. 13A.

Referring to FIGS. 13A and 13B, the light field display apparatus may include a display panel 110 including a plurality of sub-pixels SP and a micro lens array 120 including a plurality of micro lenses ML.

The sub-pixels SP may include a plurality of red sub-pixels R, a plurality of green sub-pixels G and a plurality of blue sub-pixels B. The sub-pixels SP may be arranged in a first direction D1 and a second direction D2 which is substantially perpendicular to the first direction D1.

Two sub-pixels which are adjacent to each other in the second direction D2 may be arranged at a first angle θ which is an acute angle with respect to the first direction D1. The first angle θ may be 60 degree.

The sub-pixels SP of the same color may be continuously disposed in a diagonal direction which makes a second angle β which is acute angle with respect to the second direction D2. The second angle β may be 30 degree. Thus, the red sub-pixels R may be continuously arranged in the diagonal direction, the green sub-pixels G may be continuously arranged in the diagonal direction, and the blue sub-pixels B may be continuously arranged in the diagonal direction. The red sub-pixels R, the green sub-pixels G and the blue sub-pixels B may be repeatedly arranged.

The micro lens ML may have a hexagonal shape. The hexagonal shape may be regular hexagonal. The micro lenses ML may be arranged so that adjacent sides thereof contact with each other to form a honeycomb structure. Two sides of the micro lens ML may be in parallel with the first direction D1.

In the three micro lenses, each of which is in contact with each other, the green sub-pixel G, the red sub-pixel R, and the blue sub-pixel B may correspond to the same positions of each micro lens (e.g. small circles in the figure). The same positions may form an equilateral triangle.

Figure 14B:
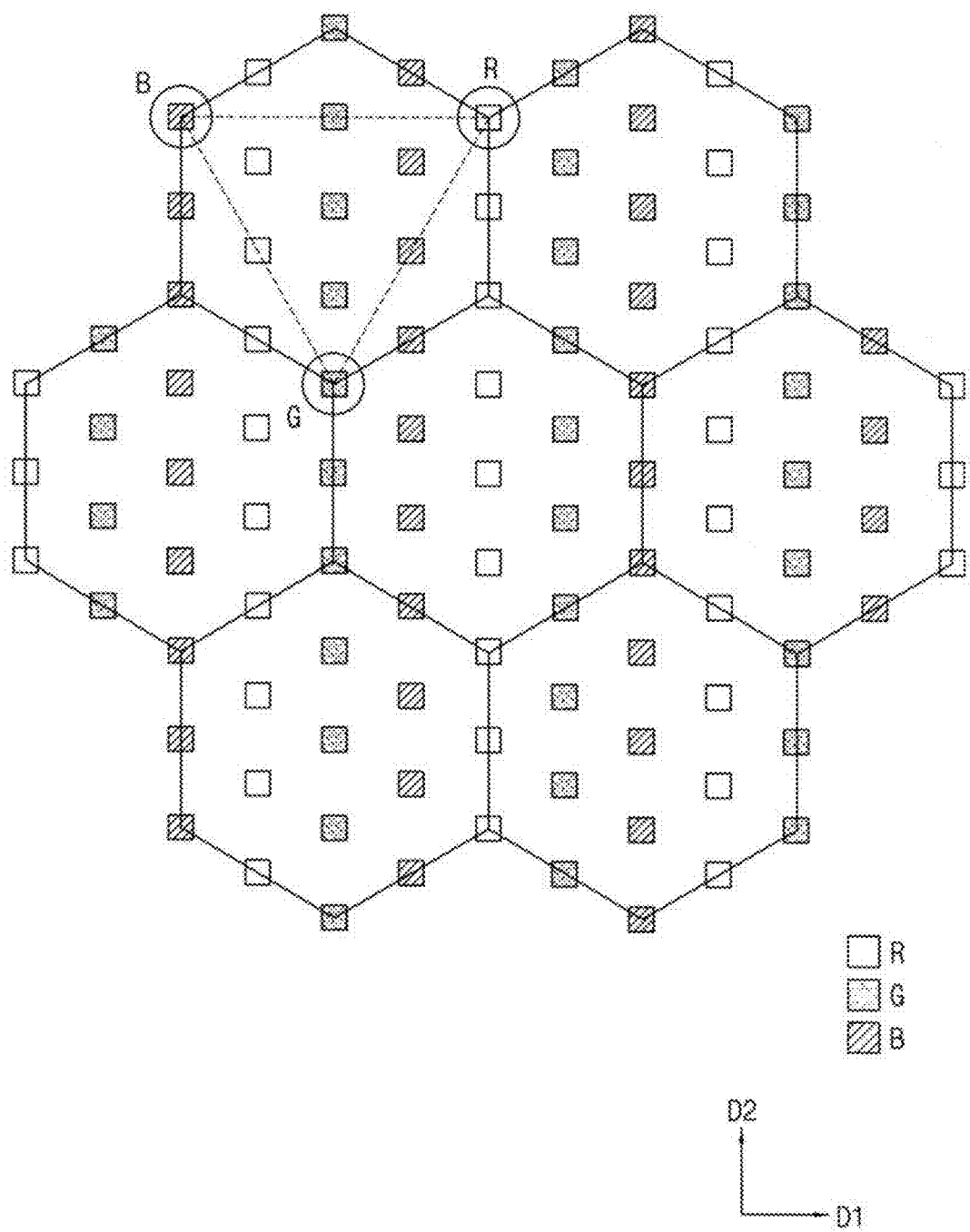
FIG. 14B is a plan view illustrating the light field display apparatus of FIG. 14A.

FIG. 14A is a schematic view illustrating a light field display apparatus according to an exemplary embodiment of the present inventive concept. FIG. 14B is a plan view of the light field display apparatus of FIG. 14A.

Referring to FIGS. 14A and 14B, the light field display apparatus may be substantially the same as the light field display apparatus of FIG. 2, except for a shape of a micro lens ML and an arrangement of sub-pixels SP. Thus, any omitted details may be assumed to be similar to or identical to details previously described with respect to the prior figures.

The light field display apparatus 100 may include a display panel 110 including a plurality of sub-pixels SP and a micro lens array 120 including a plurality of micro lenses ML.

The sub-pixels SP may include a plurality of red sub-pixels R, a plurality of green sub-pixels G and a plurality of blue sub-pixels B. The sub-pixels SP may be arranged in a first direction D and a second direction D2 which is substantially perpendicular to the first direction D1.

Two sub-pixels which are adjacent to each other in the second direction D2 and one sub-pixel pixel adjacent to the two sub-pixels in the first direction D1 may be arranged at a first angle α1 which is an acute angle. For example, the first angle α1 may be 60 degree. Thus, the sub-pixels SP may be staggered in the second direction D2.

Three sub-pixels which are adjacent to each other in the first direction D1 may be arranged at a second angle α2 which is an obtuse angle. For example, the second angle α1 may be 120 degree.

Same color of sub-pixels SP may be continuously arranged in the second direction D2. Thus, the red sub-pixels R may be continuously arranged in the second direction D2, the green sub-pixel G may be continuously arranged in the second direction D2, and the blue sub-pixel B may be continuously arranged in the second direction D2.

The micro lens ML may have a hexagonal shape. The hexagonal shape may be that of a regular hexagon. The micro lenses ML may be arranged so that adjacent sides thereof contact with each other to form a honeycomb structure. Two sides of the micro lens ML may be in parallel with the second direction D2.

In the three micro lenses, each of which is in contact with each other, the green sub-pixel G, the red sub-pixel R, and the blue sub-pixel B may correspond to the same positions of each micro lens (e.g. small circles in the figure). The same positions may form an equilateral triangle.

According to an exemplary embodiment of the present inventive concept, a light field display apparatus includes a display panel including a plurality of sub-pixels, and a micro lens array including a plurality of micro lenses. The sub-pixels having different colors corresponding to same position of each of the micro lenses, and mixed color light of these can be white. Accordingly, users can view a natural 3D image in which a specific color is not emphasized.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A light field display apparatus comprising:
a display panel comprising a plurality of sub-pixels arranged in a matrix; and
a micro lens array disposed on the display panel, the micro lens array comprising a plurality of micro lenses, each of which having six corners,
wherein each of the plurality of sub pixels emits light of a single color, of a set of three primary colors including a first primary color, a second primary color, and a third primary color,
wherein mixed color light of the sub-pixels corresponding to same positions of each of the adjacent micro lenses is white, and
wherein for each micro lens of the plurality of micro lenses, at least a first corner of the six corners overlaps a sub-pixel of the first primary color, at least a second corner of the six corners overlaps a sub-pixel of the second primary color, and at least a third corner of the six corners overlaps a sub-pixel of the third primary color.

2. The light field display apparatus of claim 1, wherein the micro lens has a hexagonal shape, and adjacent sides of two micro lenses make contact with each other to form a honeycomb structure.

3. The light field display apparatus of claim 2, wherein the sub-pixels comprises a plurality of red sub pixels, a plurality of green sub-pixels and a plurality of blue sub pixels which are alternately arranged in the first direction, and same color of sub-pixels are continuously arranged in the second direction to form a stripe pattern.

4. The light field display apparatus of claim 3, wherein the micro lenses are arranged at a tilt angle with respect to the first direction and the second direction, respectively.

5. The light field display apparatus of claim 4, wherein the tilt angle is determined by the following equation 1:

$$\text{tilt angle} = \tan^{-1}[(\text{sub-pixel vertical pitch})/((\text{number of horizontal viewpoints})*(\text{sub-pixel horizontal pitch}))], \quad [\text{equation 1}]$$

where, the sub-pixel vertical pitch is a distance in the second direction between centers of the two adjacent sub-pixels, the sub-pixel horizontal pitch is a distance in the first direction between centers of the two adjacent sub-pixels, the number of horizontal viewpoints is the number of sub-pixels in a horizontal pitch, and the horizontal pitch a distance in the first direction between centers of the two adjacent micro lenses.

6. The light field display apparatus of claim 5, wherein the number of horizontal viewpoints is 2n+2, where n is a positive integer, a number of vertical viewpoints is the number of sub-pixels in a vertical pitch, the vertical pitch is a distance in the second direction between centers of the two adjacent micro lenses, and the number of vertical viewpoints is a natural number close to the value of horizontal viewpoints/3.

7. The light field display apparatus of claim 2, wherein two sides of the hexagonal shape facing each other have a same length, and the hexagonal shape is an asymmetric hexagonal shape.

8. The light field display apparatus of claim 7, wherein a distance between upper vertex and lower vertex of the hexagonal shape in the first direction is less than a horizontal pitch of one sub-pixel.

9. The light field display apparatus of claim 1, wherein the micro lens has a circular or elliptical shape.

10. The light field display apparatus of claim 1, wherein the micro lens has a quadrangle shape.

11. The light field display apparatus of claim 1, wherein the sub-pixels comprises a plurality of red sub pixels, a plurality of green sub-pixels and a plurality of blue sub pixels, and one red sub-pixel and one blue sub-pixel are corresponding to two green sub-pixels.

12. The light field display apparatus of claim 11, wherein two sides of the hexagonal shape facing each other have same length, the hexagonal shape is an asymmetric hexagonal shape, and one side of the hexagonal shape is in parallel with the second direction.

13. The light field display apparatus of claim 1, wherein in three micro lenses each of which is in contact with each other, red sub-pixel, green sub-pixel and blue sub-pixel are corresponding to same positions of each of the three micro lenses, respectively.

14. The light field display apparatus of claim 13, wherein the red sub-pixel, the green sub-pixel and the blue sub-pixel corresponding to the same positions form vertexes of an equilateral triangle.

15. The light field display apparatus of claim 1, wherein in four micro lenses each of which is in contact with each other, red sub -pixel, green sub-pixel, blue sub pixel and white sub-pixel are corresponding to same positions of each of the four micro lenses, respectively.

16. The light field display apparatus of claim 15, wherein the red sub-pixel, the green sub-pixel, the blue sub-pixel and the white sub-pixel corresponding to the same positions form vertexes of a parallelogram.

17. The light field display apparatus of claim 1, wherein in three micro lenses, comprising two micro lenses contacting each other and one micro lenses spaced apart from the two micro lenses by one micro lens, a red sub-pixel, a green sub-pixel and a blue sub-pixel correspond to same positions of each of the three micro lenses, respectively.

18. The light field display apparatus of claim 1, wherein the sub-pixels comprises a plurality of red sub pixels, a plurality of green sub-pixels and a plurality of blue sub pixels,
   wherein two sub-pixels adjacent to each other in the second direction are disposed at a first angle which is an acute angle with respect to the first direction,
   wherein same color of sub-pixels are continuously arranged in the diagonal direction which makes a second angle which is an acute angle with respect to the second direction,
   wherein the micro lens has a hexagonal shape, and one side of the hexagonal shape is in parallel with the first direction, and
   wherein in three micro lenses each of which is in contact with each other, the red sub-pixel, the green sub-pixel and the blue sub-pixel correspond to same positions of each of the three micro lenses, respectively.

19. The light field display apparatus of claim 18, wherein the hexagonal shape is a regular hexagonal shape, wherein the first angle is 60 degree, and wherein the second angle is 30 degree.

20. The light field display apparatus of claim 1, wherein the sub-pixels comprises a plurality of red sub pixels, a plurality of green sub-pixels and a plurality of blue sub pixels,
   wherein three sub-pixels which are adjacent to each other in the first direction are disposed to form an obtuse first angle,
   wherein two sub pixels adjacent to each other in the second direction and one sub-pixel adjacent to the two sub-pixels in the first direction are disposed to form an obtuse second angle,
   wherein same color of sub-pixels are continuously arranged in the second direction,
   wherein the micro lens has a hexagonal shape, one side of the hexagonal shape is in parallel with the second direction, and
   wherein in three micro lenses, each of which is in contact with each other, the red sub-pixel, the green sub-pixel and the blue sub-pixel correspond to same positions of each of the three micro lenses, respectively.

21. The light field display apparatus of claim 20, wherein the hexagonal shape is a regular hexagonal shape, wherein the first angle is 60 degree, and wherein the second angle is 120 degree.

22. A light field display apparatus comprising:
   a display panel comprising a plurality of sub-pixels arranged in a matrix; and
   a micro lens array disposed on the display panel, the micro lens array comprising a plurality of micro lenses,
   wherein each of the plurality of sub pixels emits light of a single color, of a set of primary colors,
   wherein mixed color light of the sub-pixels corresponding to same positions of each of the adjacent micro lenses is white,
   wherein the micro lens has a hexagonal shape, and adjacent sides of two micro lenses make contact with each other to form a honeycomb structure,
   wherein the sub-pixels comprises a plurality of red sub pixels, a plurality of green sub-pixels and a plurality of blue sub pixels which are alternately arranged in the first direction, and same color of sub-pixels are continuously arranged in the second direction to form a stripe pattern,
   wherein the micro lenses are arranged at a tilt angle with respect to the first direction and the second direction, respectively,
   wherein the tilt angle is determined by the following equation 1, $$\text{tilt angle} = \tan^{-1}[(\text{sub-pixel vertical pitch})/((\text{number of horizontal viewpoints})*(\text{sub-pixel horizontal pitch})], \quad [\text{equation 1}]$$

where, the sub-pixel vertical pitch is a distance in the second direction between centers of the two adjacent sub-pixels, the sub-pixel horizontal pitch is a distance in the first direction between centers of the two adjacent sub-pixels, the number of horizontal viewpoints is the number of sub-pixels in a horizontal pitch, and the horizontal pitch a distance in the first direction between centers of the two adjacent micro lenses,
   wherein the number of horizontal viewpoints is $2n+2$, ($n=1, 2, 3 \ldots$), a number of vertical viewpoints is the number of sub-pixels in a vertical pitch, the vertical pitch is a distance in the second direction between centers of the two adjacent micro lenses, and the number of vertical viewpoint is a natural number close to the value of horizontal viewpoints/3, and
   wherein the number of horizontal viewpoints is 14, and the number of vertical viewpoints is 5.

23. A light field display apparatus, comprising:
   a display panel comprising a plurality of sub pixels arranged in a matrix form; and
   a micro lens array disposed on the display panel comprising a plurality of micro lenses, each of which having six corners,
   wherein each of the plurality of sub-pixels emits light of a single color, of a set of three primary colors including a first primary color, a second primary color, and a third primary color,
   wherein light of the sub-pixels corresponding to same positions of three or four micro lenses of the plurality of micro lenses which are make contact to each other, combines to form white light, or wherein light of the sub-pixels corresponding to same positions of the three micro lenses of the plurality of micro lenses, the three micro lenses comprising two micro lenses contacting each other and one micro lenses spaced apart from the two micro lenses by one additional micro lens of the plurality of micro lenses, combines to form white, and
   wherein for each micro lens of the plurality of micro lenses, at least a first corner of the six corners overlaps a sub-pixel of first primary color, at least second corner of the six corners overlaps a sub-pixel of the second primary color, and at least a third corner of the six corners overlaps a sub-pixel of the third primary color.

24. The light field display apparatus of claim 23, wherein each of the plurality of micro lenses has an asymmetric hexagonal shape.

25. The light field display apparatus of claim 23, wherein each of the plurality of micro lenses has a hexagonal shape, and wherein each of the plurality of micro lenses is arranged at a tilt angle with respect to an arranged direction of the sub pixels.

* * * * *